(12) United States Patent
Manders

(10) Patent No.: US 7,243,989 B2
(45) Date of Patent: Jul. 17, 2007

(54) OPEN ROOF CONSTRUCTION FOR A VEHICLE

(75) Inventor: Peter C. L. J. Manders, Horst (NL)

(73) Assignee: Inalfa Roof Systems Group B.V. (NL)

( * ) Notice: Subject to any disclaimer, the term of this patent is extended or adjusted under 35 U.S.C. 154(b) by 21 days.

(21) Appl. No.: 11/173,953

(22) Filed: Jul. 1, 2005

(65) Prior Publication Data

US 2006/0006700 A1    Jan. 12, 2006

Related U.S. Application Data

(63) Continuation-in-part of application No. 10/399,818, filed as application No. PCT/NL01/00780 on Oct. 25, 2001, now abandoned.

(30) Foreign Application Priority Data

Oct. 26, 2000    (NL) ................................... 1016489

(51) Int. Cl.
 *B60J 7/047* (2006.01)
(52) U.S. Cl. ................................ 296/216.03
(58) Field of Classification Search ............ 296/216.03
 See application file for complete search history.

(56) References Cited

U.S. PATENT DOCUMENTS

| | | | |
|---|---|---|---|
| 6,158,803 A | 12/2000 | Reihl et al. | 296/216.04 |
| 6,568,750 B2 | 5/2003 | Radmanic et al. | 296/216.03 |
| 6,572,183 B2 | 6/2003 | Wingen et al. | 296/216.03 |

FOREIGN PATENT DOCUMENTS

| | | |
|---|---|---|
| DE | 42 38 946 | 11/1993 |
| DE | 197 13 347 | 5/1999 |
| FR | 2 384 640 | 10/1978 |

*Primary Examiner*—Dennis H. Pedder
(74) *Attorney, Agent, or Firm*—Steven M. Koehler; Westman, Champlin & Kelly, P.A.

(57) ABSTRACT

An open roof construction of a vehicle comprises a closure element that mates with a roof opening, which closure element is movable along a first longitudinal guide and a second longitudinal guide. To this end, the closure element includes a front support, which is supported in the first longitudinal guide, and a guide element, which is slidable in the second longitudinal guide. An adjusting element, which is movable in the longitudinal direction by means of an actuating element being driven from the drive unit, is disposed under said closure element, which adjusting element is fitted with the guide element and which is arranged for moving the guide element into and out of engagement with the second longitudinal guide. Optionally, the adjusting element moves laterally during the longitudinal movement.

26 Claims, 22 Drawing Sheets

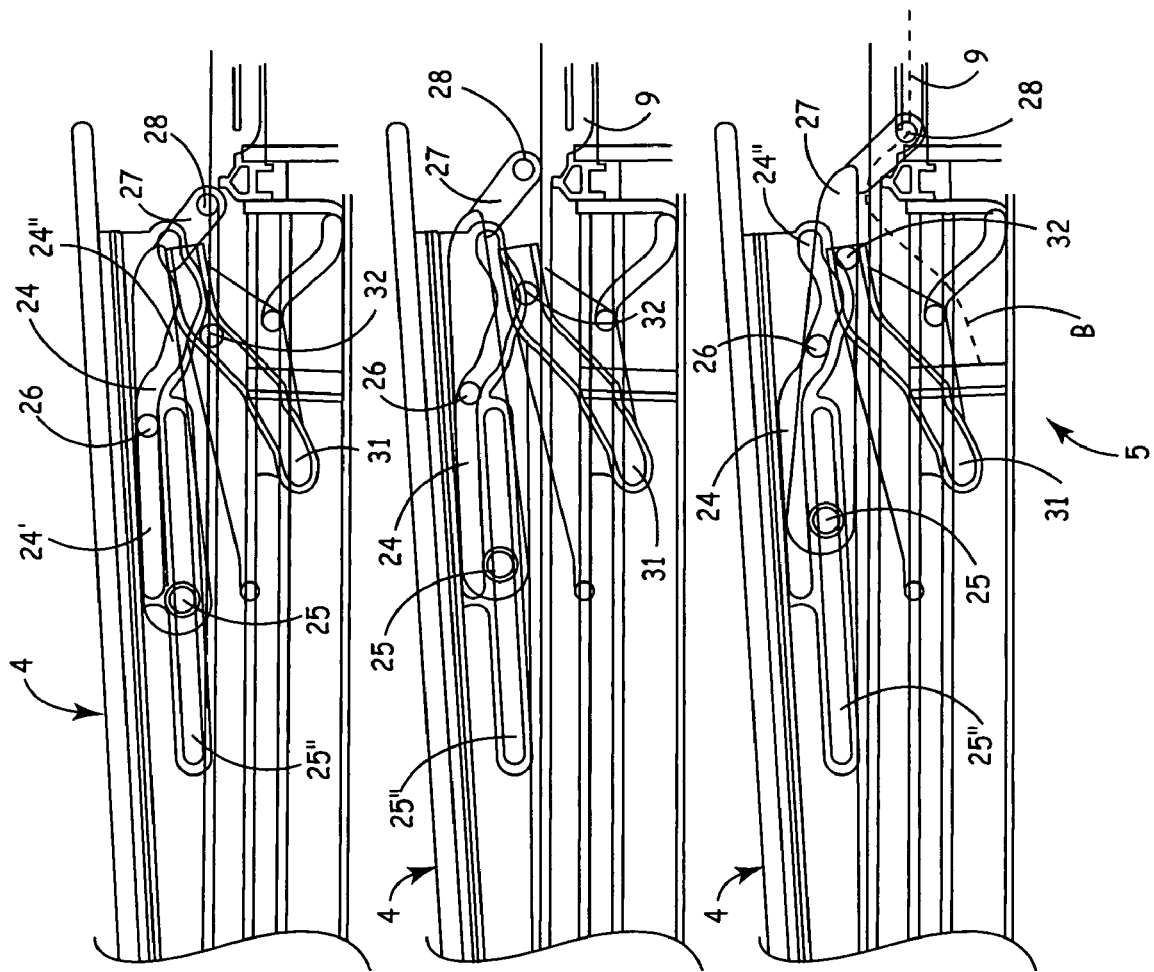
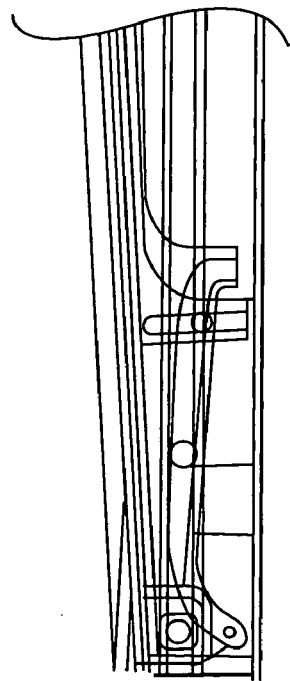
FIG. 16c
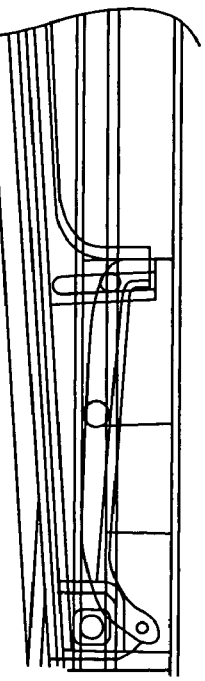
FIG. 16d
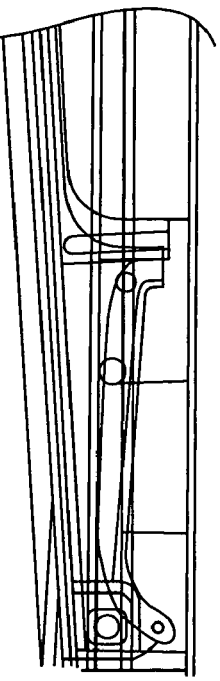
FIG. 16e

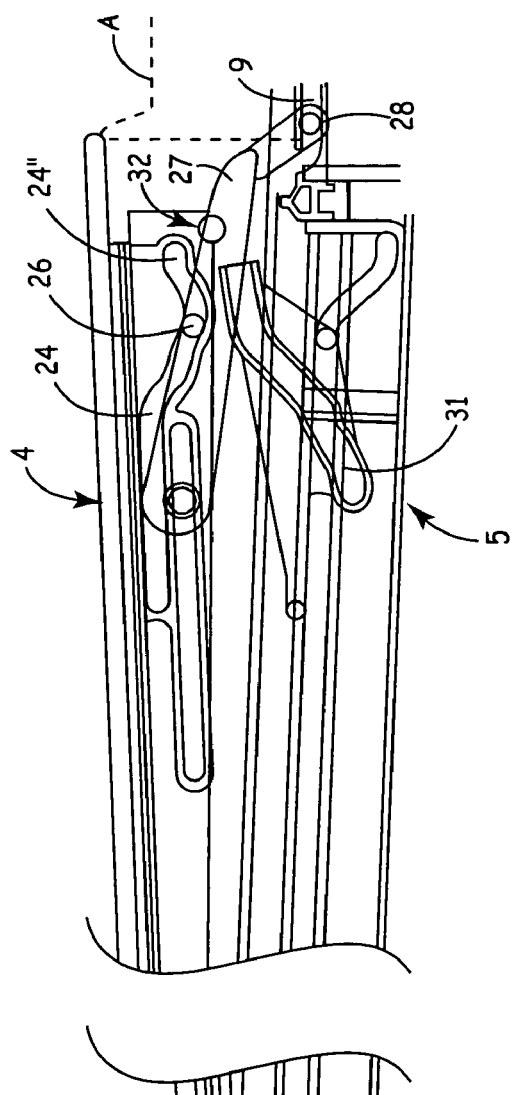
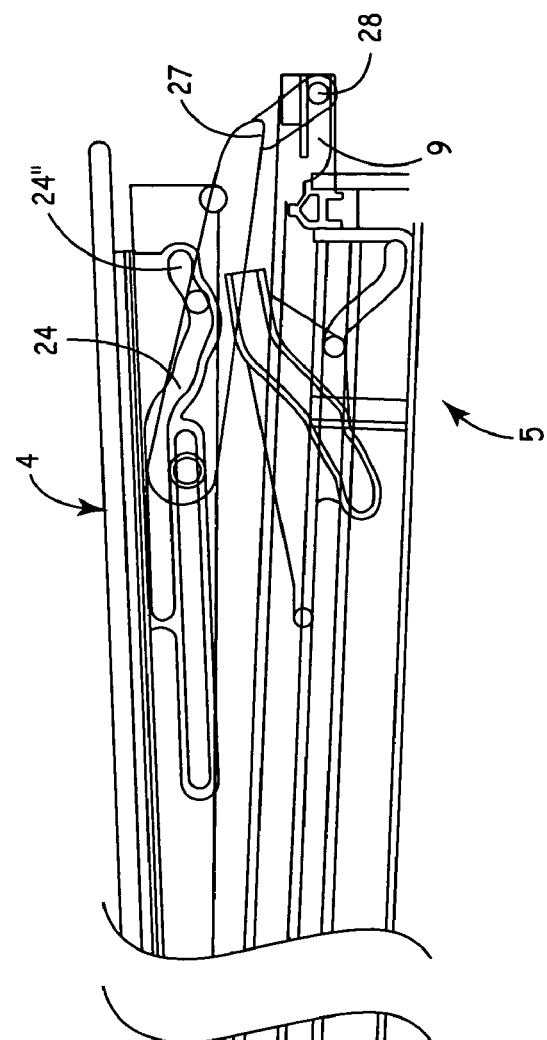
FIG. 16f
FIG. 16g

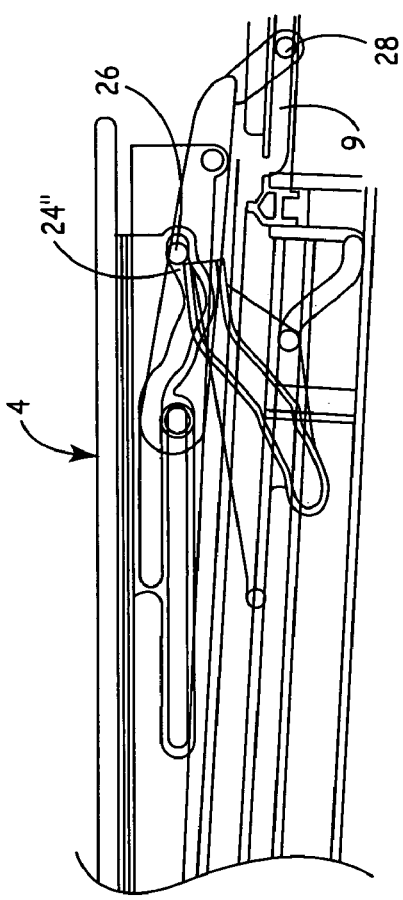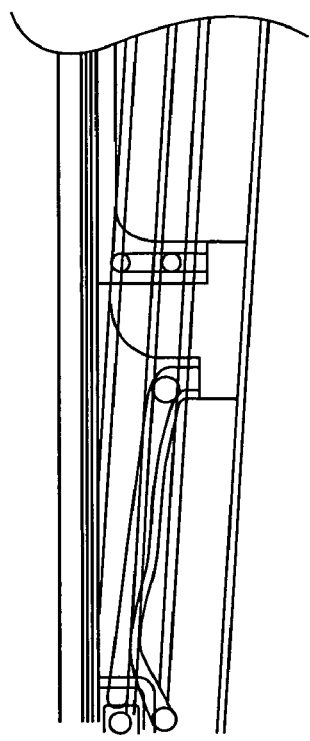
FIG. 16h
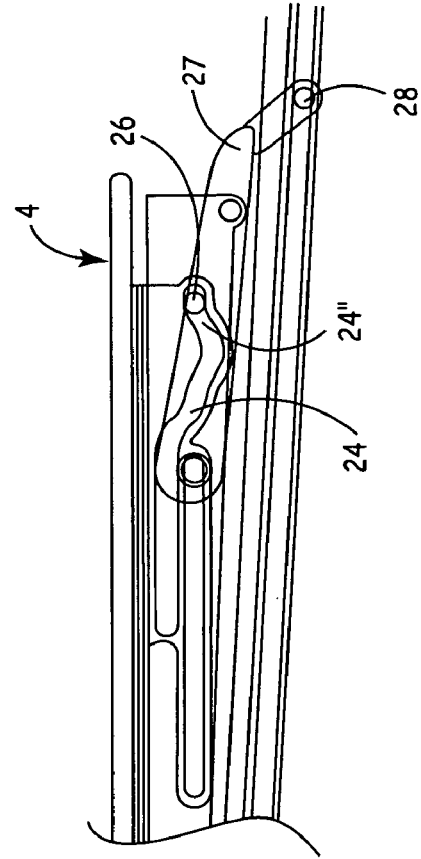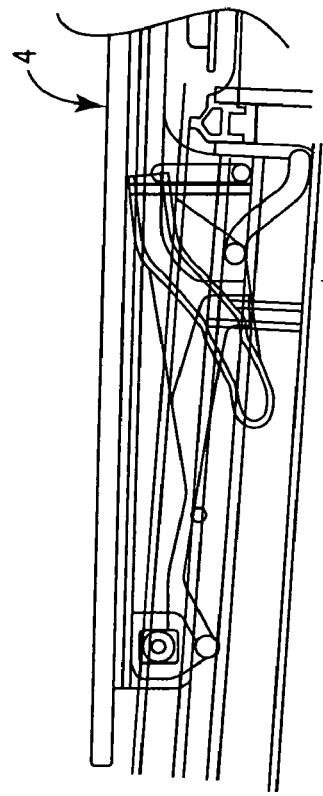
FIG. 16i

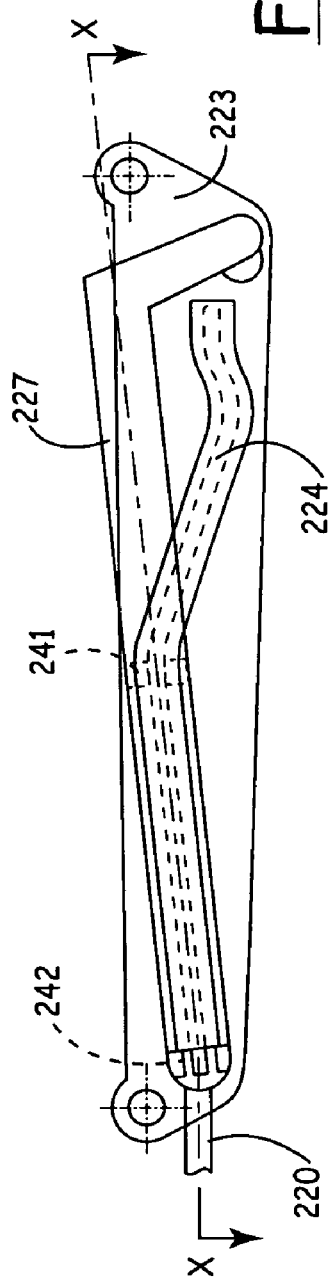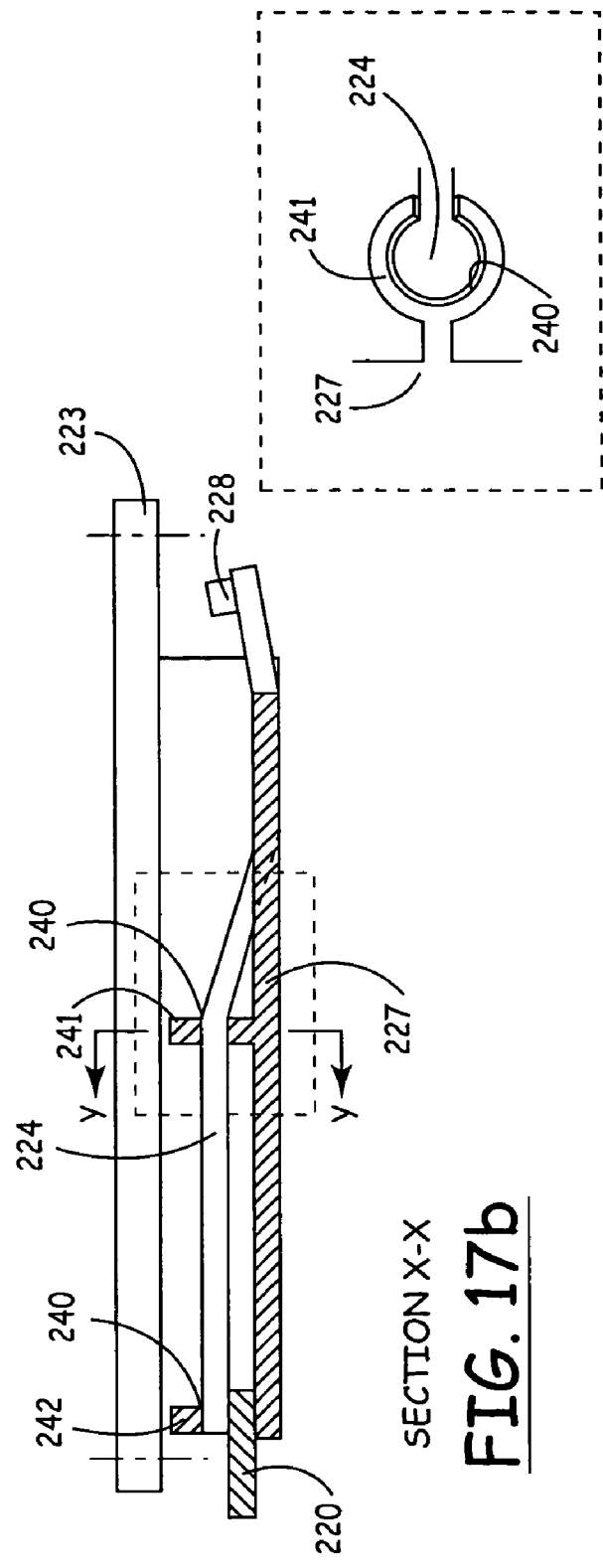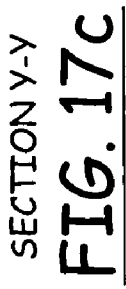

SECTION X'-X'

SECTION X"-X"

OPEN ROOF CONSTRUCTION FOR A VEHICLE

CROSS-REFERENCE TO RELATED APPLICATION

The present application is a Continuation in Part of and claims priority of U.S. patent application Ser. No. 10/399,818, filed Apr. 22, 2003, now abanoned, which claims priority of International Application No. PCT/NL01/00780, filed Oct. 25, 2001 and published as WO 02/34558 on May 2, 2002 in Dutch, the contents of both of which are hereby incorporated by reference in its entirety.

BACKGROUND OF THE INVENTION

The present invention relates to an open roof construction assembly for a vehicle. Such an open roof construction is known, for example, from DE-C-42 38 944 or DE-C-42 38 945.

SUMMARY OF THE INVENTION

An open roof construction for a vehicle comprises a closure element co-operating with a roof opening and being movable along first and second longitudinal guides. For this purpose, the closure element comprises a front support supported in the first longitudinal guide and a guiding element slidable in the second longitudinal guide. Below the closure element there is provided an adjusting element movable in a longitudinal direction by means of an operating member controlled by a drive. The adjusting element is provided with the guiding element and is adapted to bring the guiding element into and out of the engagement with the second longitudinal guide.

Since the guide element is present on the adjusting element which is controlled from the drive unit, the engagement of the guide element in the second longitudinal guide can take place independently of the movements of the closure element, thus enabling greater freedom and improved control.

In one embodiment, the second longitudinal guides are recessed in the fixed roof, so that said longitudinal guide hardly affects the appearance of the vehicle roof, if at all.

It may be very advantageous in that case if the second longitudinal guides are disposed on side edges of a roof panel which has at least substantially the same cross dimension as the closure element of the open roof construction. This will give the roof a very attractive appearance, with the fixed roof panel being made of glass or another material.

In that case, the adjusting element is designed so that the guide element is capable of lateral movement (with respect to longitudinal movement of the closure element) upon moving into and out of engagement with the second longitudinal guide.

It is possible in that case to construct the first longitudinal guide in the usual manner and position it under the closure element in the closed position of the closure element, whilst the guide element can be moved not only rearwards but also outwards in the direction of the second longitudinal guide, which is positioned further outwards than the first longitudinal guide when the closure element is being opened.

BRIEF DESCRIPTION OF THE DRAWINGS

The invention will be explained in more detail hereafter with reference to the drawings, which shows exemplary embodiments of the open roof construction according to the invention.

FIGS. 16a–16i are cut-away views that collectively illustrate a height adjusting mechanism adjusting a closure element from a closed position to an open rearward position in accordance with the present inventions.

FIGS. 17a–17g illustrate an alternative embodiment in accordance with the present inventions that includes a guide arm that is adapted for lateral movement.

BRIEF DESCRIPTION OF THE ILLUSTRATIVE EMBODIMENTS

Figure 1:
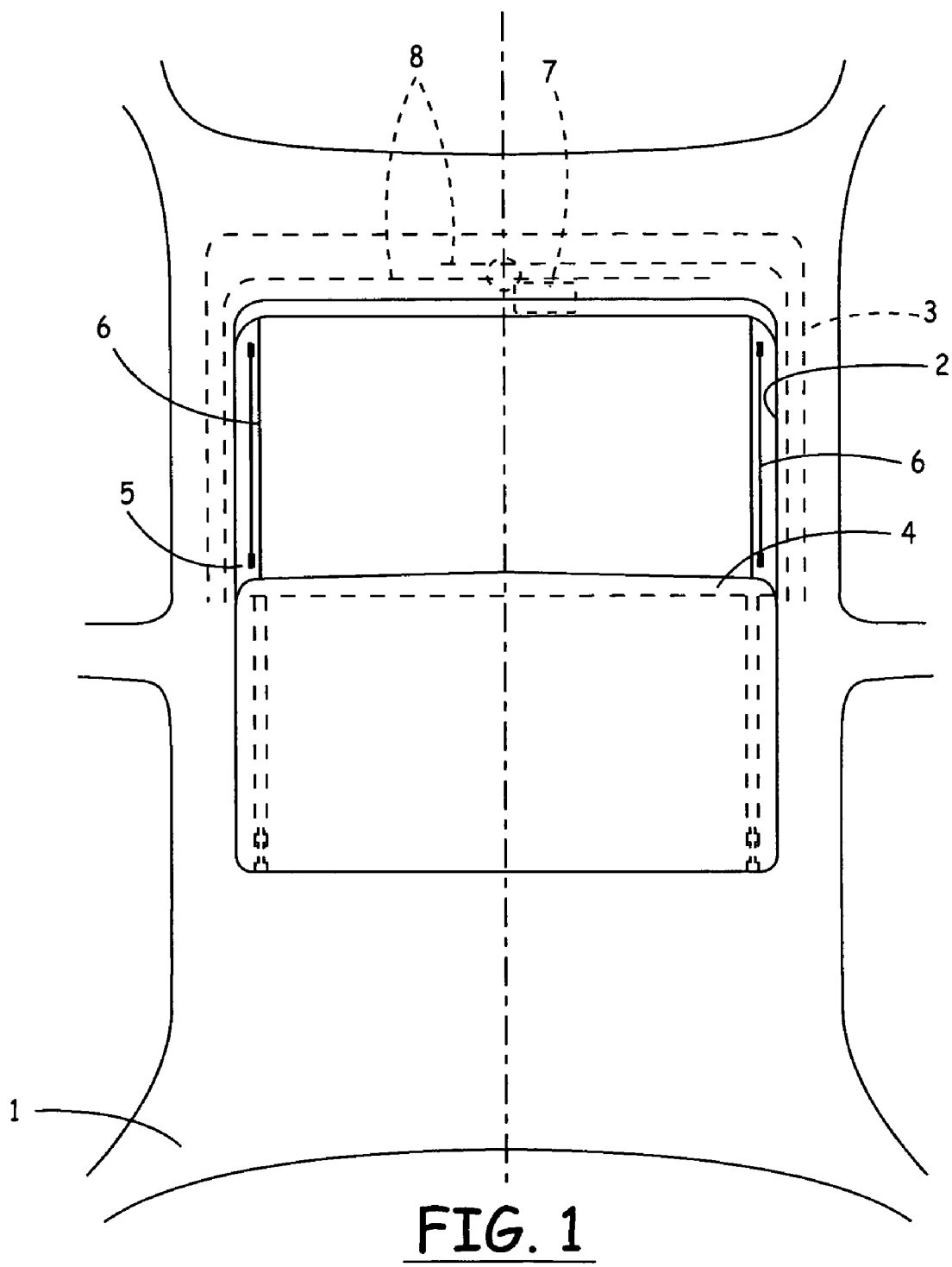
FIG. 1 is a very schematic top plan view of a vehicle roof fitted with a first exemplary embodiment of the open roof construction according to the invention.

The drawing, and in the first instance FIG. 1 thereof, shows the fixed roof 1 of a motor vehicle, such as a car, in the fixed roof 1 of which an opening 2 is formed for accommodating an open roof construction assembly. The open roof construction comprises a frame 3 or similar stationary means to be fixed to the vehicle for movably supporting a closure element 4. In the illustrated embodiment, the open roof construction is a so-called spoiler roof of the top slider type, which in this embodiment is provided with a more or less rigid and preferably transparent panel 4 as the closure element, which is capable of selectively closing roof opening 2 or releasing it to a smaller or greater extent. Panel 4 is to this end laterally supported by operating mechanisms or height adjusting mechanisms 5, which are slidably accommodated in first longitudinal guides 6, which are mounted on frame 3 or form part thereof and which extend in parallel relationship in the longitudinal direction on either side of roof opening 2. Said operating mechanisms 5 can be moved synchronously in the first longitudinal guides 6, thus moving panel 4 not only in longitudinal direction but also in vertical direction. To this end, the operating mechanisms 5 are operated from a driving apparatus 7, such as an electric motor, for example via driving cables 8 that are resistant to compressive and tensile strain.

Present on the fixed roof 1, rearwards of the roof opening 2, are two parallel second longitudinal guides 9, in which a guide element (yet to be described) is guided for supporting the panel in rearward positions thereof.

Figure 2:
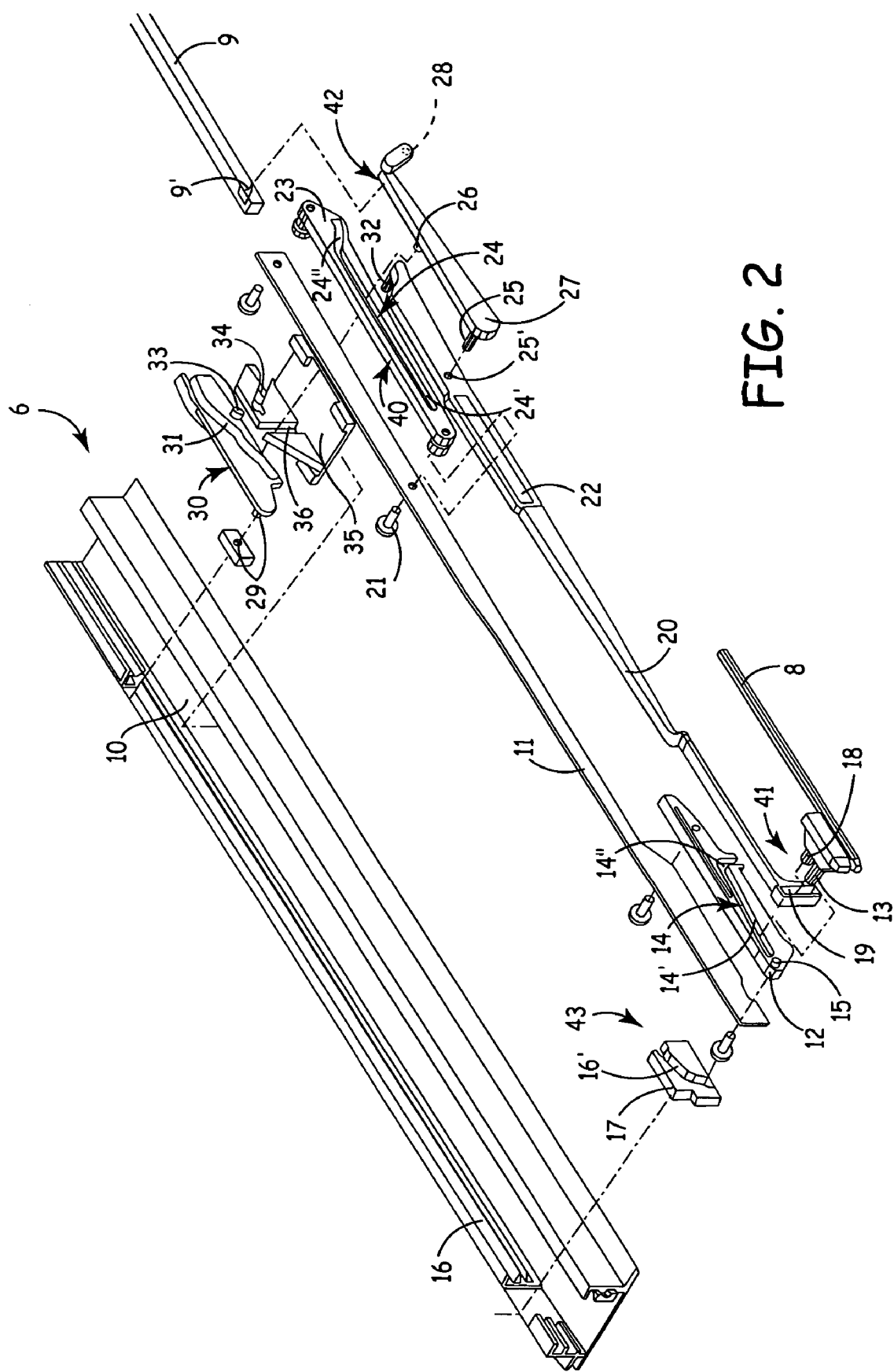
FIG. 2 is a perspective exploded view of one of the longitudinal guides and the parts that are movable therein for adjusting the closure element of the open roof construction of FIG. 1.

FIG. 2 shows the parts of the operating mechanism 5 on one side of the roof opening of the respective first longitudinal guides 6 and second longitudinal guides 9. FIG. 2 shows, the longitudinal guide 6, in which a groove 10 is present which is open at the upper side, in which groove the parts are guided. In one embodiment, longitudinal guide 6 is extruded and can be made of aluminum.

FIG. 2 shows a panel part 11, which is mounted on the underside of the panel and on which further parts can be mounted. Present at the front side of the panel part 11 is a front support 12, which is in constant engagement with a driving pin 13 that is fixed to the driving cable 8. The engagement between said driving pin 13 and the front support 12 takes place via a slot 14 in the front support 12, which slot 14 includes a front slot portion 14', which extends downwards and rearwards at a small angle from the front end, whilst a rear slot portion 14" extends in vertical direction.

A pin 15 on the front support 12, which functions as a pivot, is in engagement with a horizontally open guide groove 16 in the first longitudinal guide 6, which guide groove 16 includes a downwardly curved portion 16' at its front end, which portion 16' is formed in a separate part 17 of the first longitudinal guide 6, and which is used for a height compensation mechanism 43 collectively illustrated in FIG. 2 of the front side of the panel 4.

Another pin is formed on the driving cable 8 in the form of an actuating pin 18, which is in engagement, via a vertical groove 19, with an actuating element in the form of a section 20 which is slidable under the panel, which section 20 is slidably guided in a horizontal slot 22 with respect to panel part 11, some distance behind the vertical groove 19, due to the engagement of a fixing screw 21 that is screwed in the panel part 11.

The fixing screw 21 is also used for fixing a link 23 to the panel part 11, which link 23 is provided with a curved guide slot 24 comprising a front slot portion 24', which extends at least substantially parallel to the panel 4, and a rear curved portion 24". The guide slot 24 is engaged by a pivot pin 25 and a guide pin 26 of an arm 27 functioning as an adjusting element 42 illustrated on FIG. 2, on the rear end of which a guide element in the form of a horizontal pin 28 is present, which pin 28 can move into engagement with the horizontally open groove of the second longitudinal guide 9. The pivot pin 25 is also pivotally connected to the actuating section 20 through engagement in a hole 25' therein. The arm 27 thus follows the movements of the section 20.

The operating or height adjusting mechanism comprises a number of additional parts near the rear end of the first longitudinal guide 6. A first part is a pivoting arm 30 which pivots about a pivot 29, which pivoting arm 30 includes a curved slot 31 which is open at its rear end, in which a pin 32 formed on the rear end of the actuating section 20 can engage. The pivoting arm 30 itself has a guide pin 33, which is in engagement with an at least partially sloping guide slot 34 in a control element 35, which is capable of sliding movement over a small adjusting distance in the first longitudinal guide 6. The control element 35 is furthermore provided with a vertical adjusting slot 36, which is open at the upper side, with which the pin 32 of the section 20 is temporarily in engagement.

The operation of the above-described embodiment of the open roof construction according to the invention will now be explained with reference to FIGS. 3–10.

Figure 3:
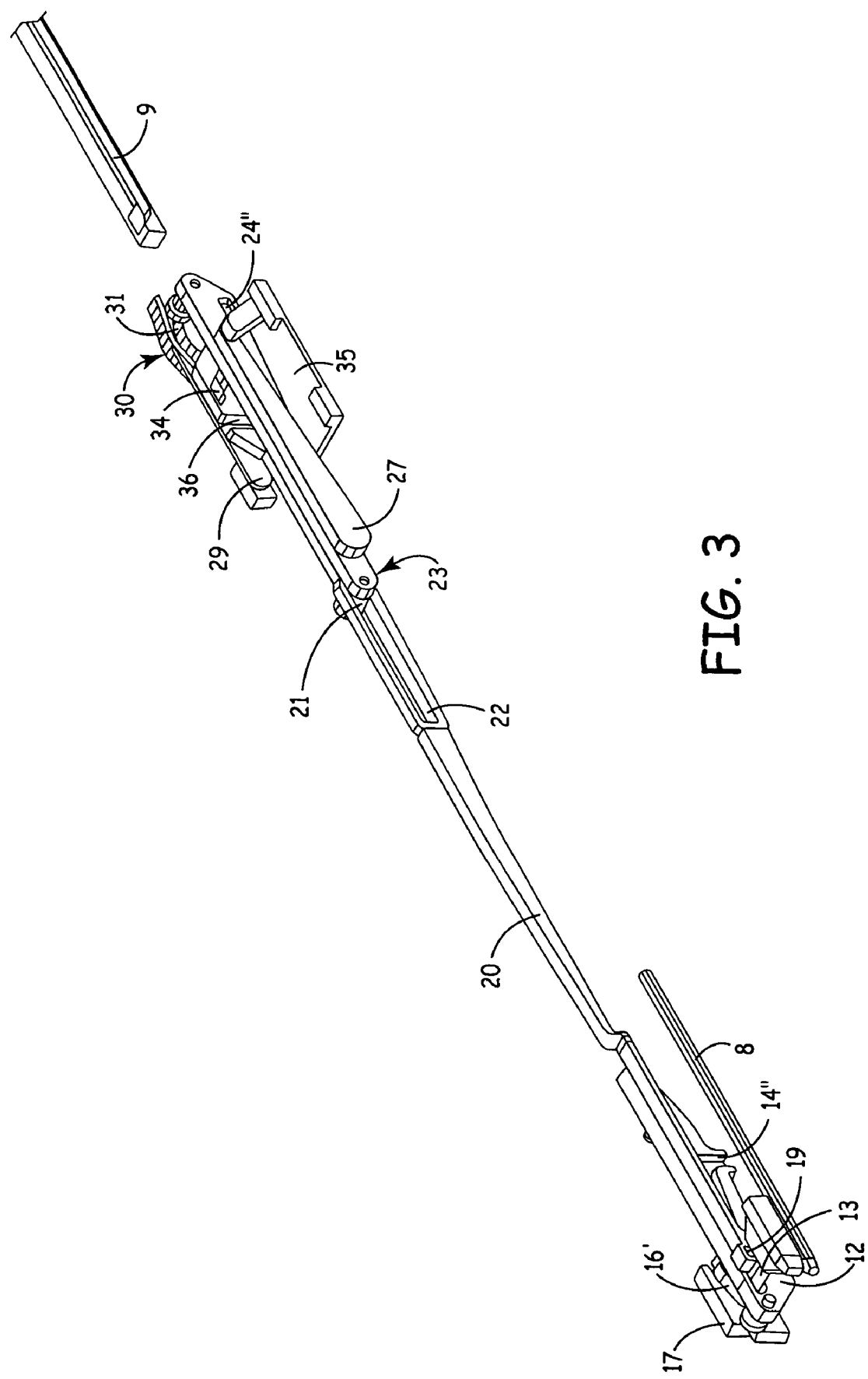
FIGS. 3–10 are perspective views of some of the parts of FIG. 2 in various positions of the closure element of the open roof construction of FIG. 1.

In FIG. 3, the panel of the open roof construction is in its closed position, in which it closes the roof opening. Referring also to FIG. 2 in the description below, the driving cable 8 is in the front position, in which position the pin 13 is located at the front end of the front slot portion 14' of the slot 14. The actuating pin 18 is positioned approximately at the top of the vertical groove 19 of the actuating section 20 to form vertically adjustable connection 41 collectively illustrated on FIG. 2, whilst the pin 15 of the front support 12 is positioned at the bottom of the front portion 16' of the guide groove 16. The actuating section 20 is in its front position, so that the fixing screw 21 is positioned at the rear end of the slot 22 in the section 20. The pin 32 on the actuating section 20 is present at the front end of the slot 31 of the downwardly pivoted pivoting arm 30, and it is furthermore positioned at the bottom of the vertical adjusting slot 36 of the control element 35. The guide pin 33 is positioned near the lower, rear open end of the guide slot 34. The arm 27 occupies its front position with respect to link 23, so that the pivot pin 25 abuts against the front end of the guide slot 24, whilst the guide pin 26 is still positioned in the front slot portion 24' of the guide slot 24.

Figure 4:
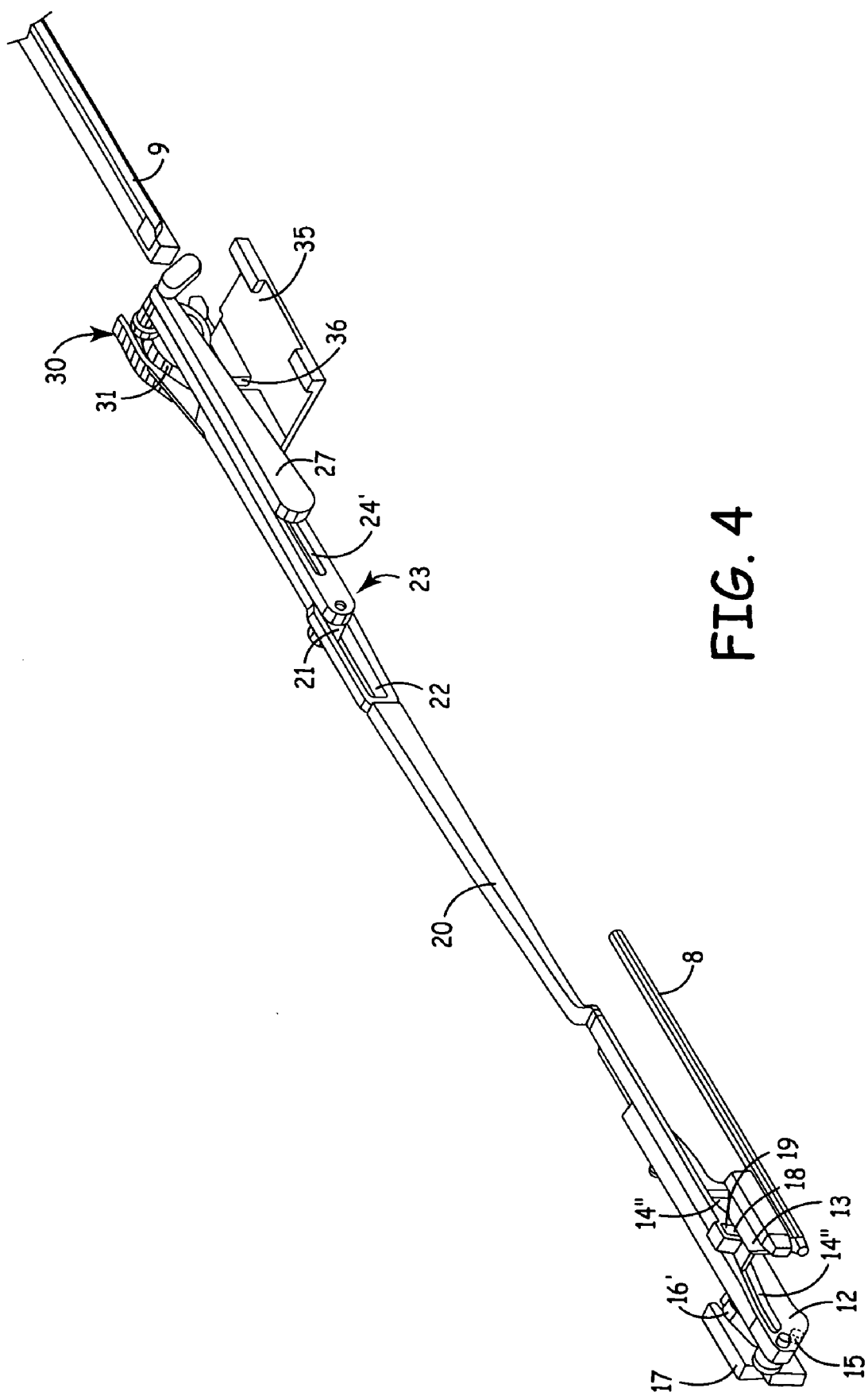

FIG. 4 shows the position in which the driving cable 8 has been moved rearwards over a small distance. During this rearward movement, the pin 13 of the driving cable 8 has moved to the rear. The front support 12 remains stationary or substantially stationary during said movement as a result of the engagement of the pin 15 in the front portion 16' of the guide groove 16. After all, the front portion 16' extends in vertical direction, thus crossing the slot 14, as a result of which the rearward movement of the front support 12 is determined by the manner in which the slot 14 and the guide groove 16 extend relative to each other. Only when the slot 14 allows movement in vertical direction of the front support 12 can the sliding pin 15 start to move through the guide groove 16.

The actuating section 20 is carried along by the actuating pin 18 of the driving cable 8 via the vertical groove 19, with the vertical groove 19 allowing any movements in vertical direction of an actuating section 20 with respect to the driving cable 8. The slot 22 of the actuating section 20 starts to move along the fixing screw 21, so that the section 20 is led to the rear. Engagement of the pin 32 on the rear end of the section 20 in the vertical adjusting slot 36 of the control element 35 causes the control element 35 to be carried along to the rear, and because of the movement of the control element 35, and thus of the guide slot 34, said guide slot 34 will move with respect to the guide pin 33 on the pivoting arm 30, so that the pivoting arm 30 will pivot about the pivot 29. The pin 32 on the section 20 also moves through the slot 31 in the pivoting arm 30 upon its rearward movement. The guide pin 32 is moved upwards both as a result of the slope of slot 31 and as a result of the upward pivoting movement of the pivoting arm 30, as a result of which the section 20, and thus the panel 4, are moved upwards in a controlled manner. The pivoting movement of the pivoting arm 30 also makes it possible to achieve a substantial lifting height of the panel 4 in spite of the small overall height of pivoting arm 30, because the slot 31 can pivot upwards.

The section 20 also carries along the arm 27 in rearward direction via the pivot pin 25, during which movement the guide pin 26 moves through the guide slot 24 of the link 23. Also the pivot pin 25 moves through the straight portion of said slot 24.

Figure 5:
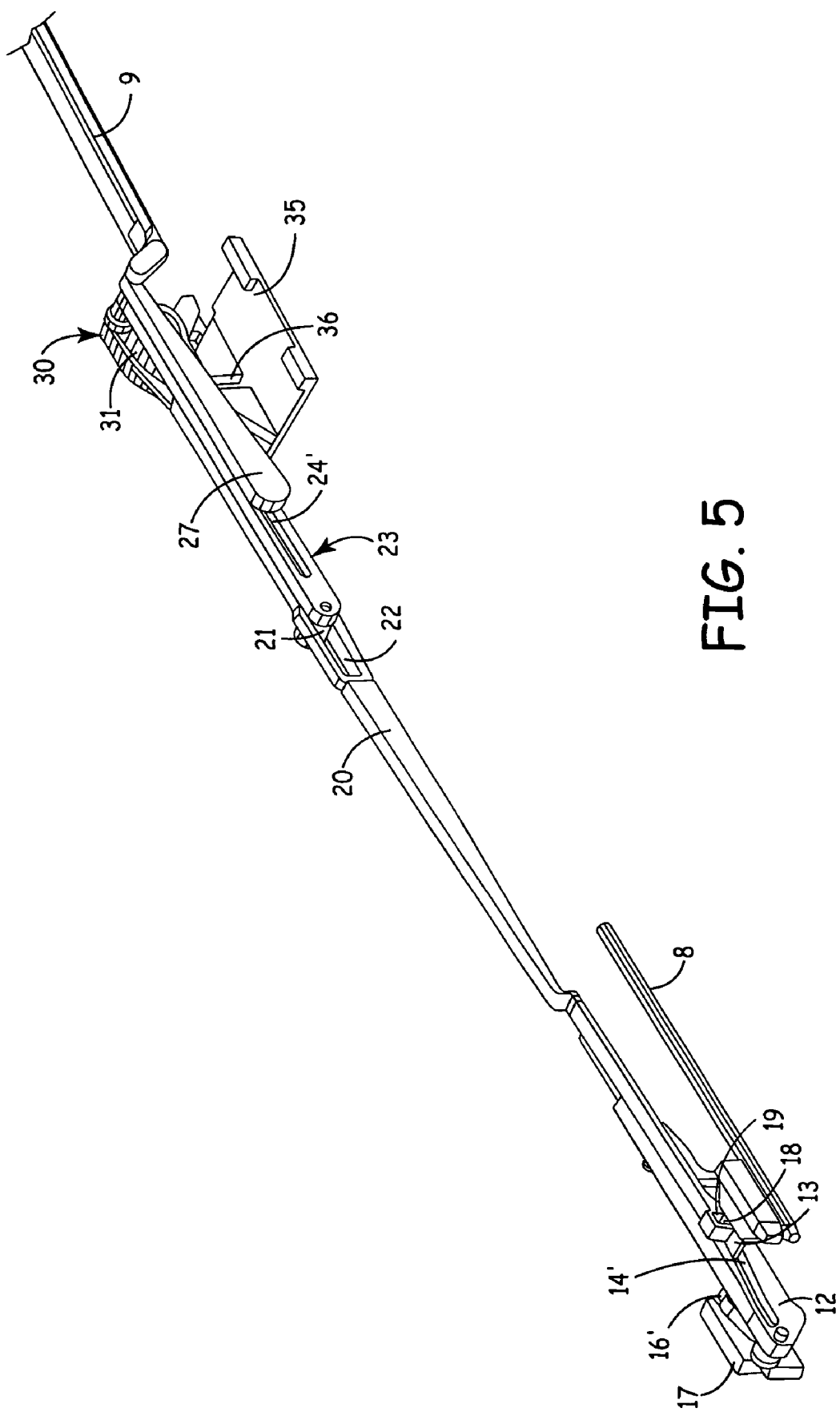

In FIG. 5, the driving cable 8 is shown to have moved even further in rearward direction, during which movement the driving pin 13 has reached a slightly downwardly extending part of the front slot portion 14' of the slot 14 in the front support 12, thus causing the pin 15 to be moved slightly rearwards and upwards in the guide groove 16. The above-described movements of parts near the rear side of the panel and/or of the height adjusting mechanism are continued. As the figure shows, the guide pin 32 on section 20 has left the adjusting slot 36 of the control element 35 in the meantime, and the guide pin 33 of the pivoting arm 30 has reached the upper end of the guide slot 34, so that the pivoting arm 30 has reached the maximally upwardly pivoted position. The control element 35 will further remain stationary.

Figure 6:
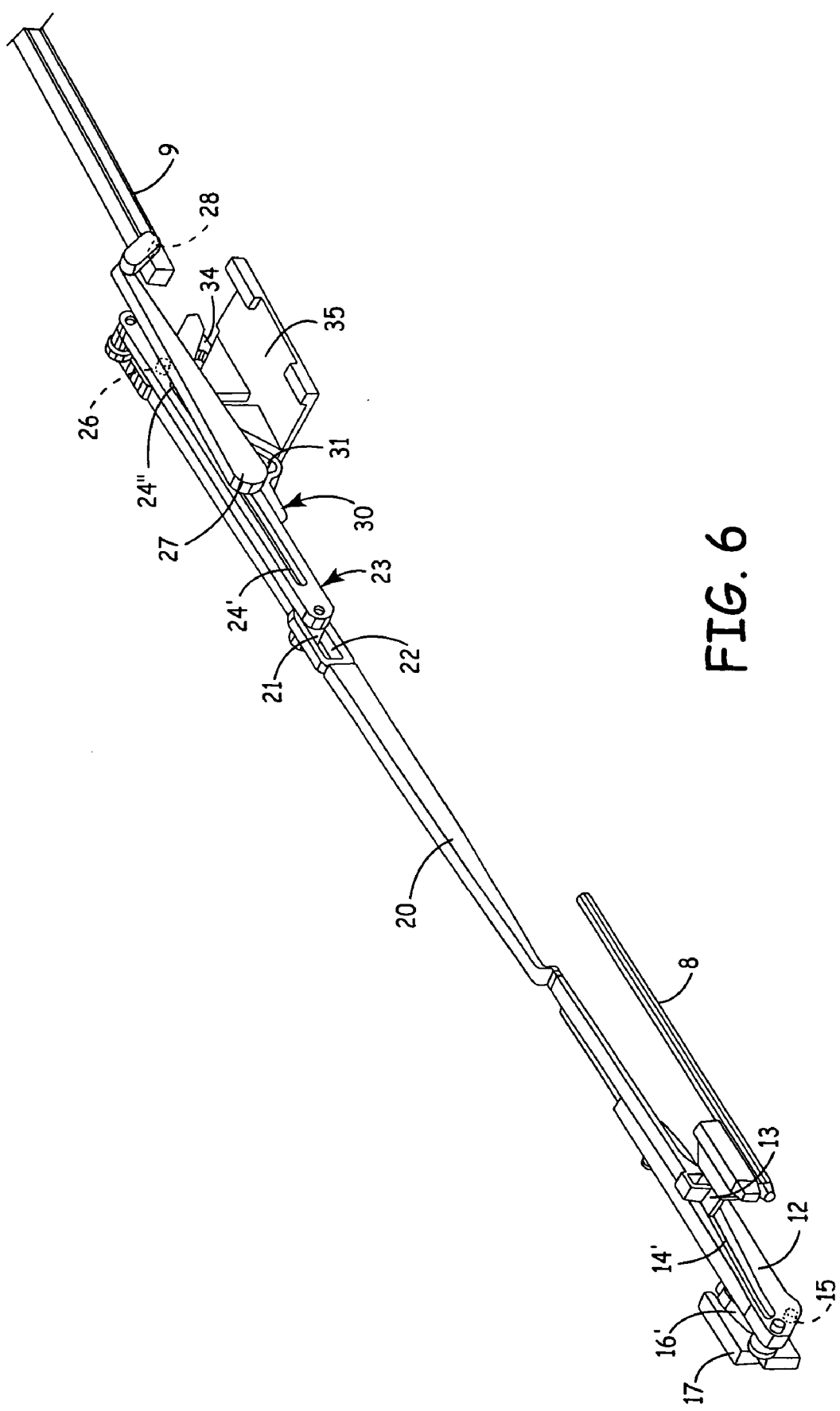

In FIG. 6, the driving cable 8 is shown to have moved even further in rearward direction, and the arm 27 is shown to have pivoted downwards as a result of forcing guide 40 collectively illustrated on FIG. 2. Forcing guide 40 includes the guide pin 26 moving through the rear slot portion 24" of the guide slot 24 upon further movement to the rear of the pivot pin 25 via the actuating element or section 20. The guide element 28 on the arm 27 has reached the upwardly curved front portion 9' of the second longitudinal guide 9 during this movement.

Figure 7:
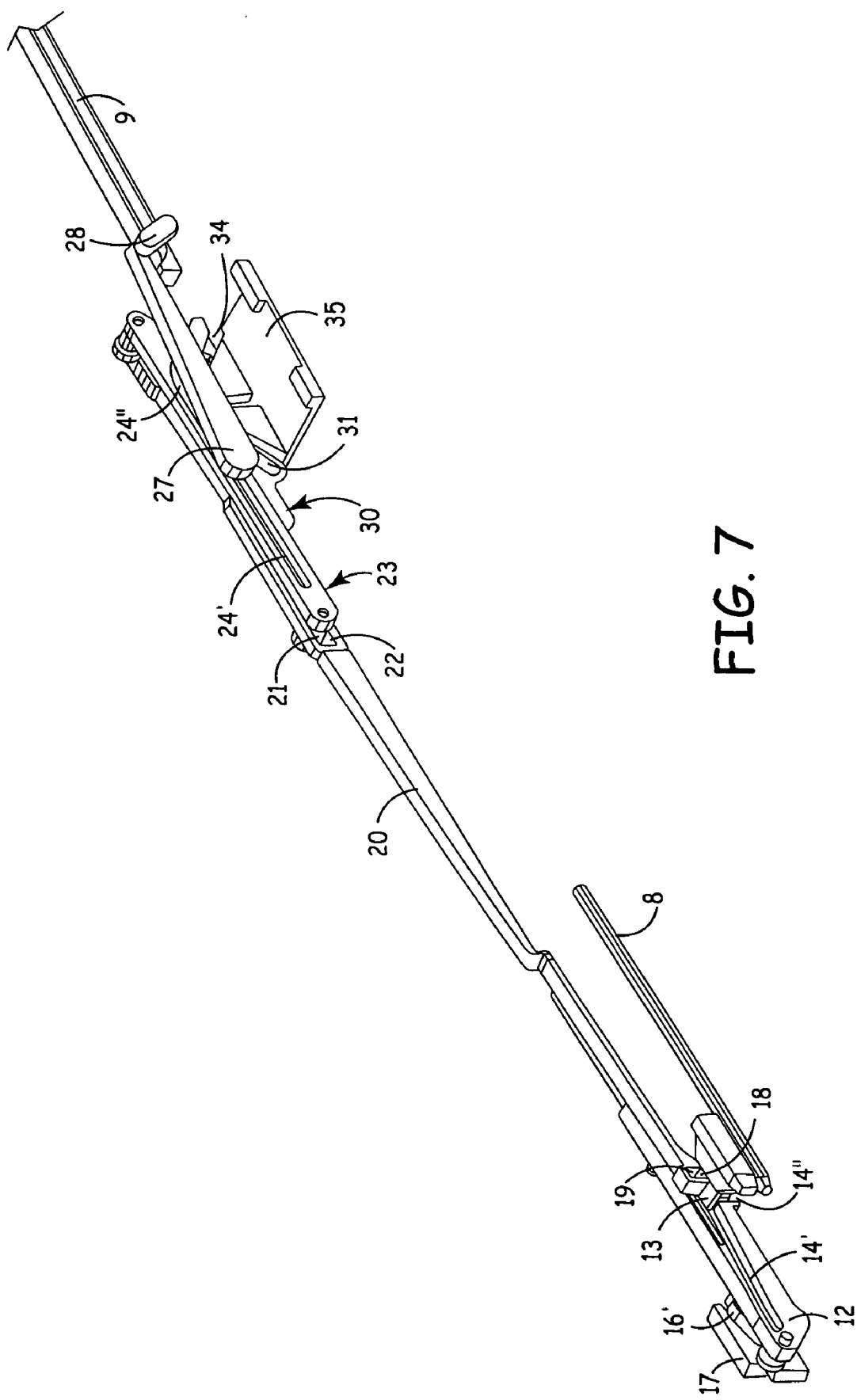

In FIG. 7, the driving cable 8 has moved so far to the rear that the driving pin 13 has arrived at the upper end of the rear, vertical slot portion 14" of the slot 14. In the meantime, the arm 27 has been moved so far rearwards by the section 20 that it has completely entered the second longitudinal guide 9, as a result of which panel 4 is supported by the second longitudinal guide 9 via the arm 27.

Figure 8:
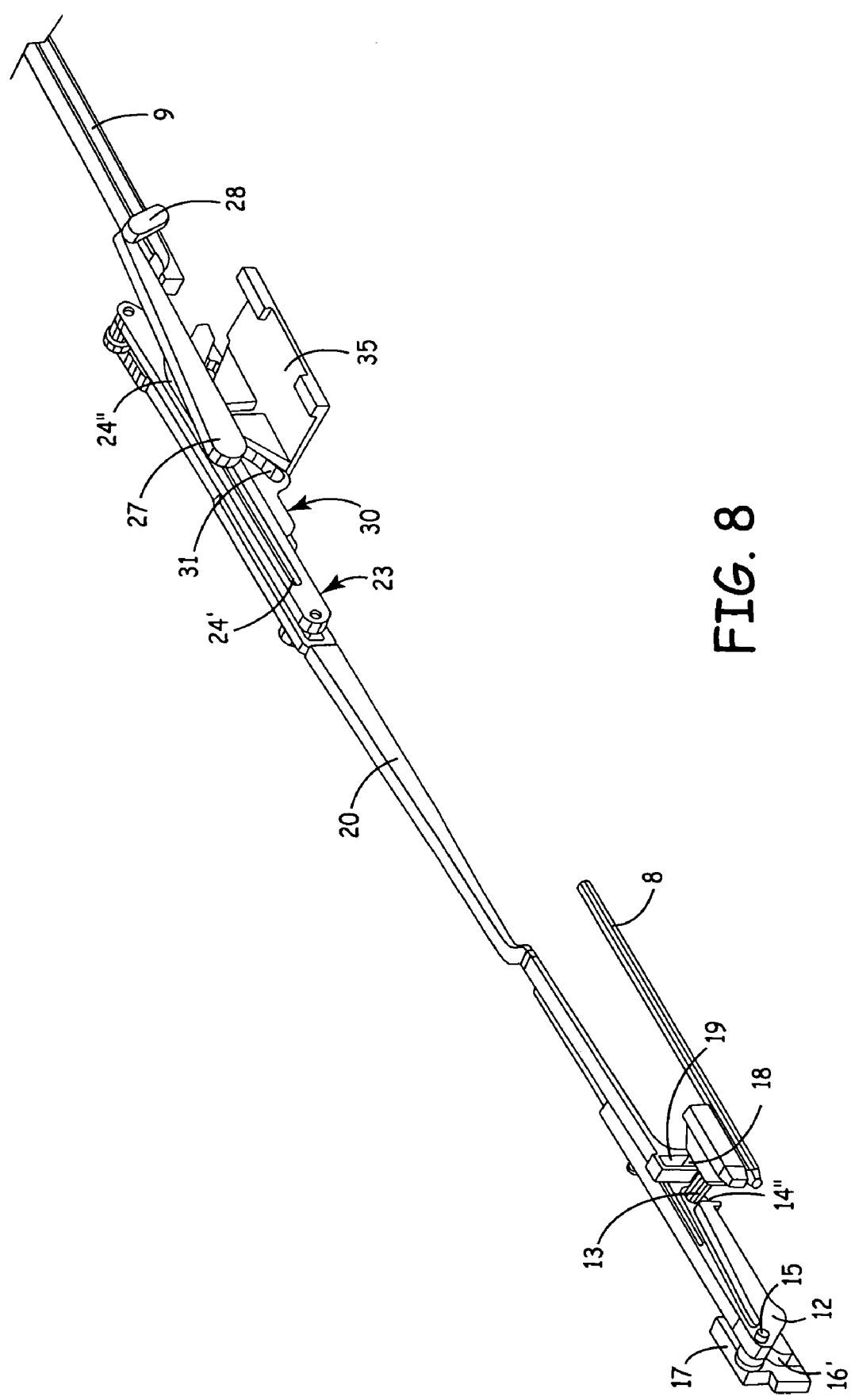

In FIG. 8, the driving pin 13 has started its movement through the vertical rear slot portion 14" of the slot 14, as a result of the fact that the upward locking engagement of the front support 12 by said pin 13 has been released and the pin 15 is now allowed to move through the guide groove 16 while lifting the front support 13, and consequently the front side of the panel 4. This does not interfere with the vertical movement of the front end of the section 20, because the vertical groove 19 of the section 20 can slide past the actuating pin 18 of the driving cable 8. In the meantime, the pin 32 of the section has left the open rear end of the slot 31 of the pivoting arm 30, as a result of which the panel 4 has become detached from the height adjusting mechanism and the panel 4 is now supported by means of the arms 27. The panel 4 will also be moved to the rear now, because the driving pin 13 carries the front support 12 along via the vertical rear slot portion 14" in the front support 12, as a result of which the panel 4 will make a translating movement.

Figure 9:
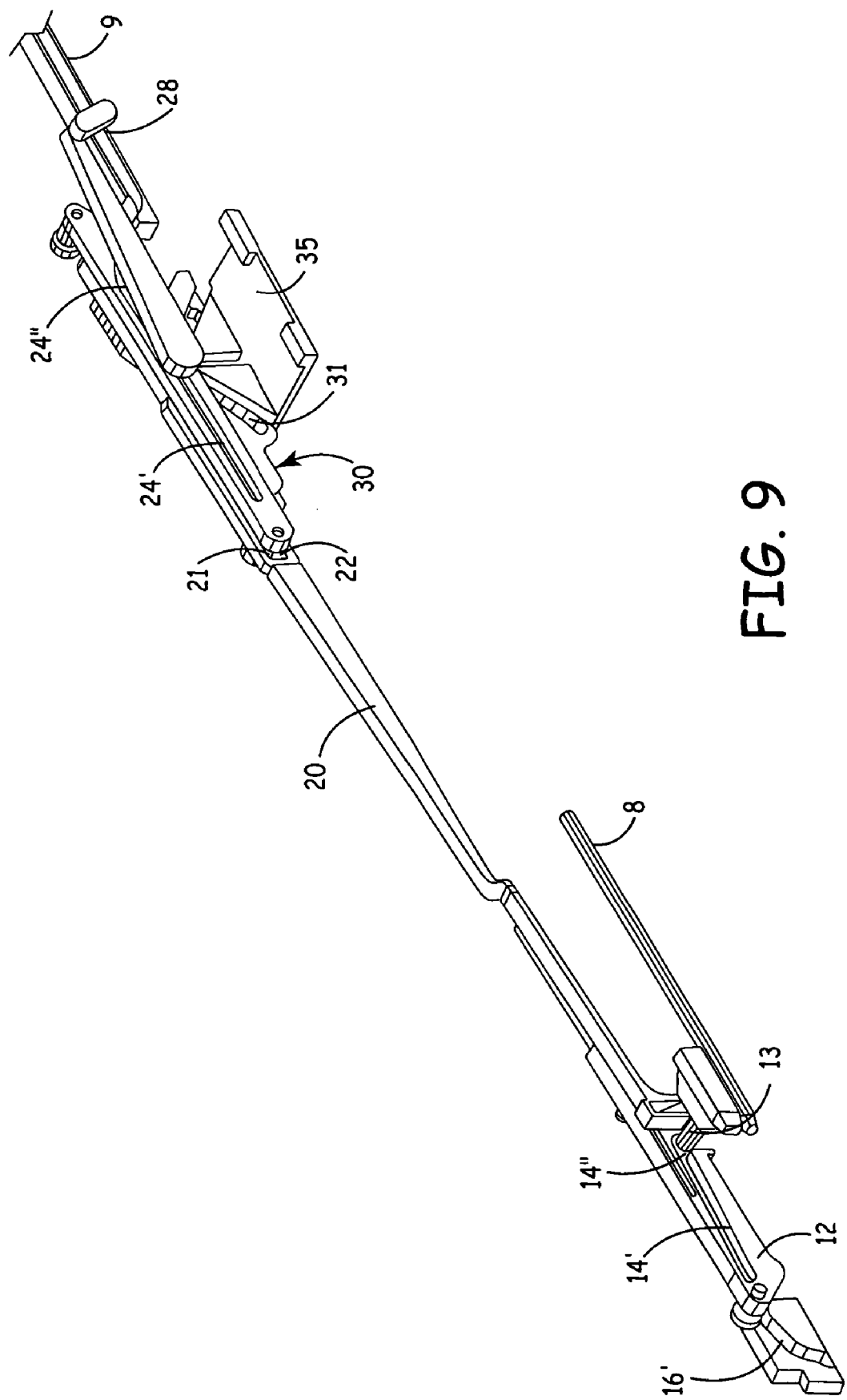

In FIG. 9, the pin 15 has reached the rear end of the front portion 16' of the guide groove 16, and said sliding pin 15 will move further through the horizontal guide groove 16 as a result of being driven by the driving pin 13 of the cable 8, which acts on the front support 12.

Figure 10:
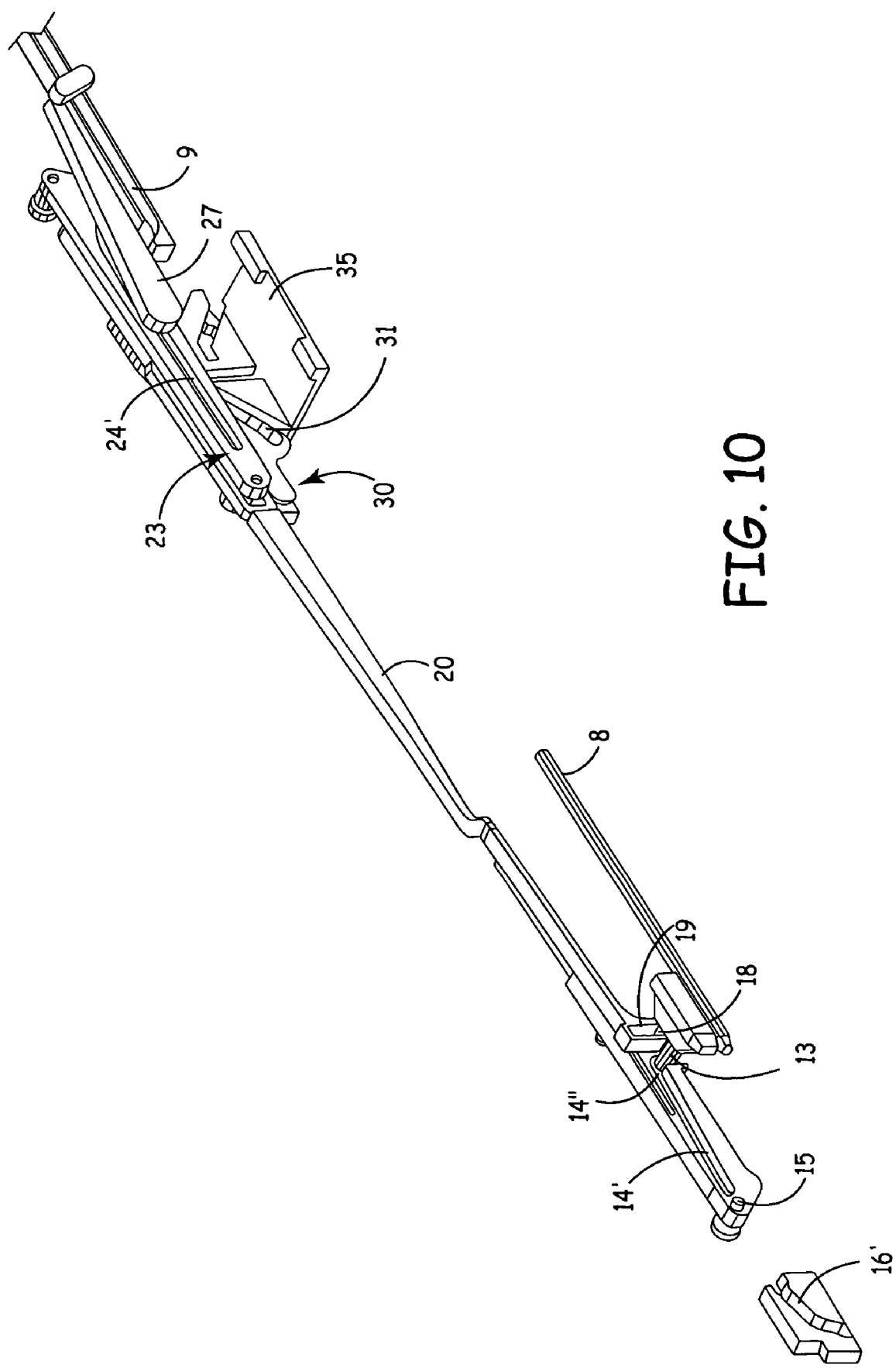

In FIG. 10, the sliding pin 15 has moved some distance through the guide slot 16 already.

Figure 11:
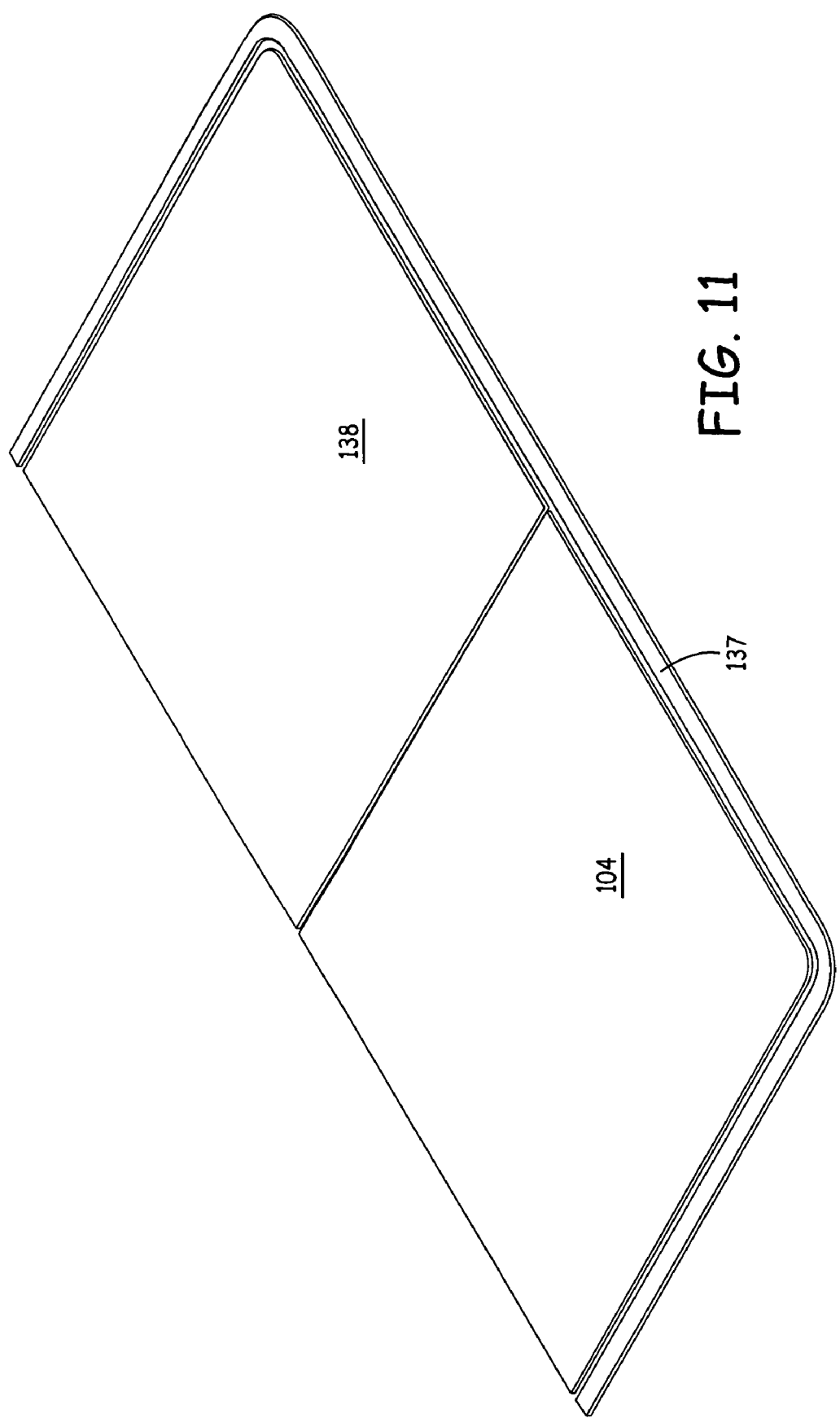
FIGS. 11–13 are perspective views of one half of a second exemplary embodiment of the open roof construction according to the invention, showing three different positions thereof.
Figure 12:
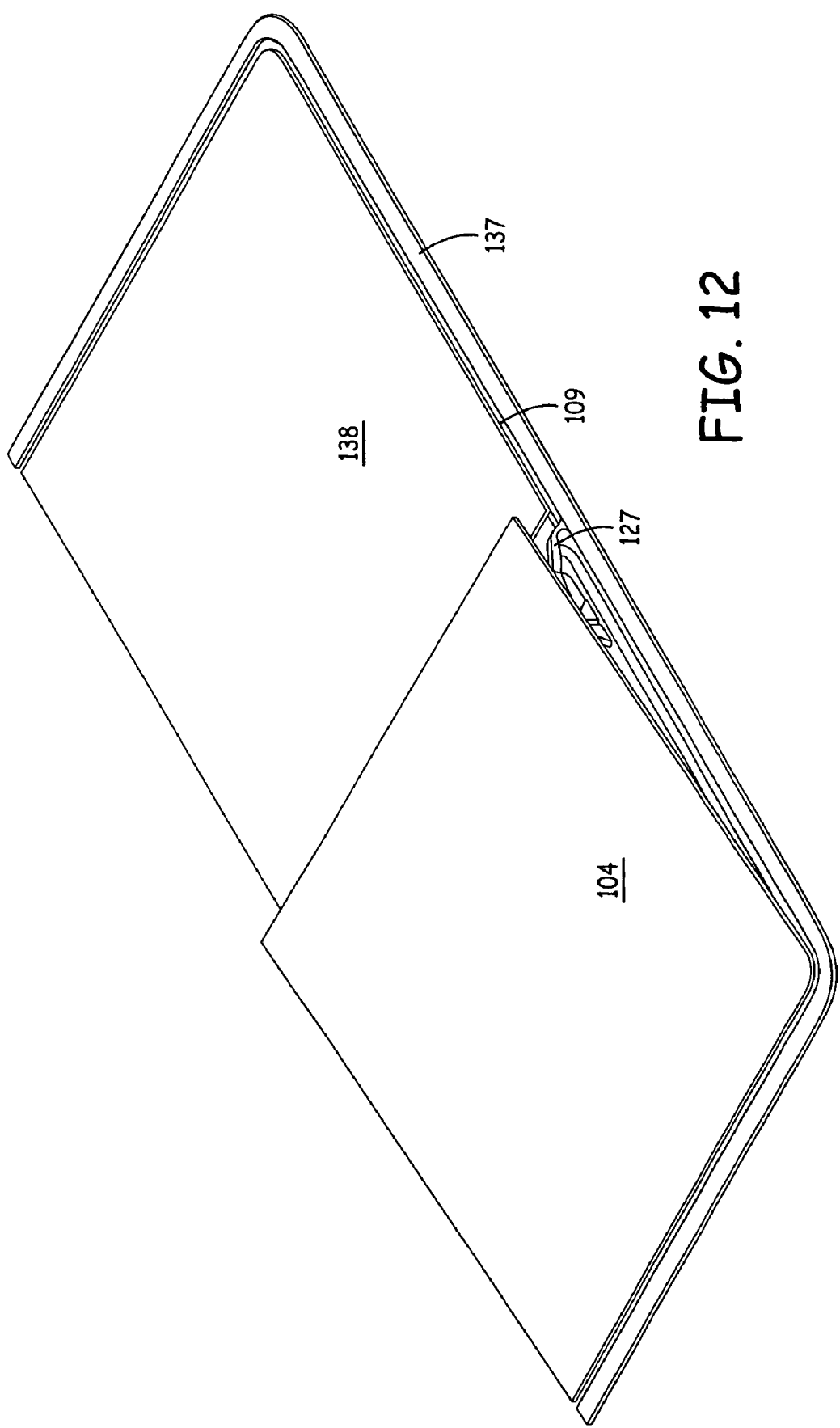
Figure 13:
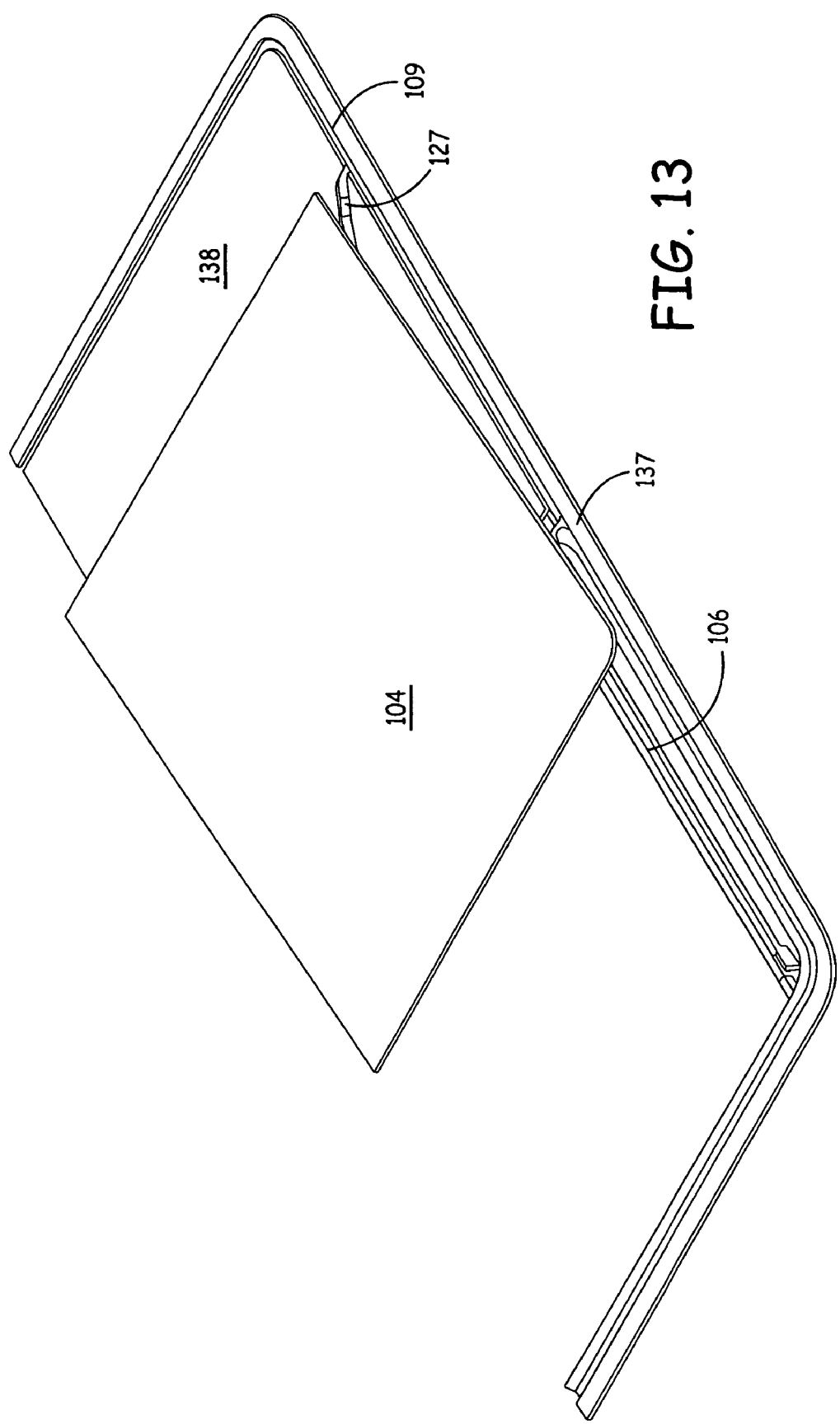

FIGS. 11–13 show a part of a second embodiment of the open roof construction according to the invention. The panel 104 can be distinguished, whilst furthermore a fixed roof panel 138 is mounted within a rim 137 of the open roof construction, which roof panel 138 is preferably made of the same material as the panel 104, but which also be made of another material, of course. As the figure shows, the cross dimension of the roof panel 138 is identical to that of the panel 104, so that an attractive-looking unit is formed in the closed condition of the panel 104. In the closed position of the panel 104, the upper side of the panels 104 and 138 also lie at least substantially in the same plane.

FIG. 12 shows the panel 104 in the ventilating position, in which position the panel 104 has moved upwards at the rear side by the height adjusting mechanism but has not moved to the rear yet. An arm 127 can be distinguished, which has pivoted downwards from the panel 104. The figure also shows, however, that the arm 127 has also pivoted outwards so as to come into engagement with the second longitudinal guide 109 that is present on the side edge of the roof panel 138, that is, outwards of the longitudinal guide 106 (FIG. 13). In this manner it is possible to use a roof panel 138 of the same width with an associated second longitudinal guide 109, which is disposed further outwards than the first longitudinal guide 106, without any special modifications of the first longitudinal guide 106 or the sealing of the panel 104 being required. In FIG. 13, the panel 104 has moved to the rear, in which position it is supported on the rear side by the arm 127 that engages in the second longitudinal guide 109.

Figure 14:
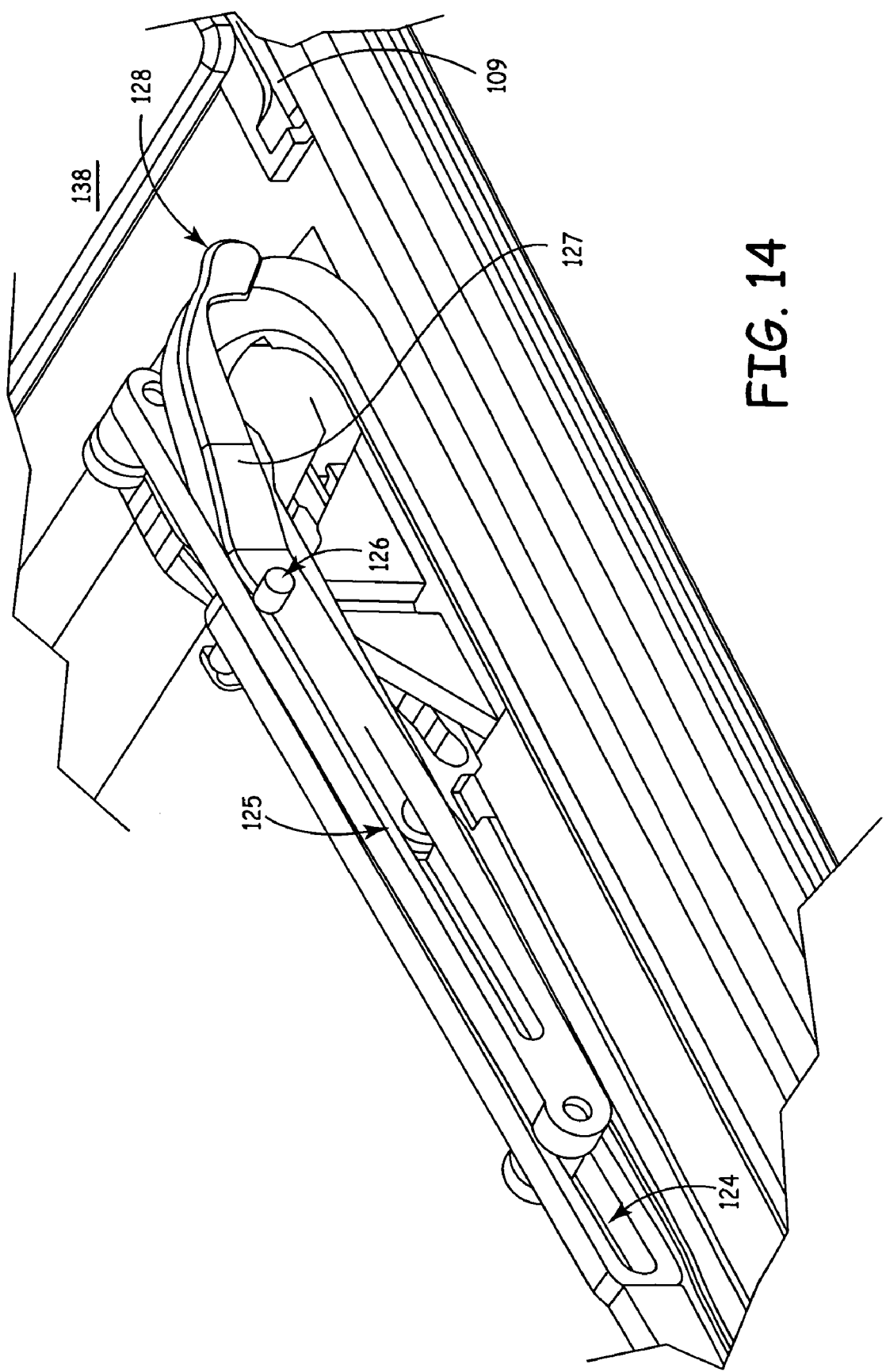
FIGS. 14–15 are two partial perspective views of a part of the height adjusting mechanism of the open roof construction of FIGS. 11–13 and a conceptual view of lateral movement of a guide arm to engage a rear guide.
Figure 15:
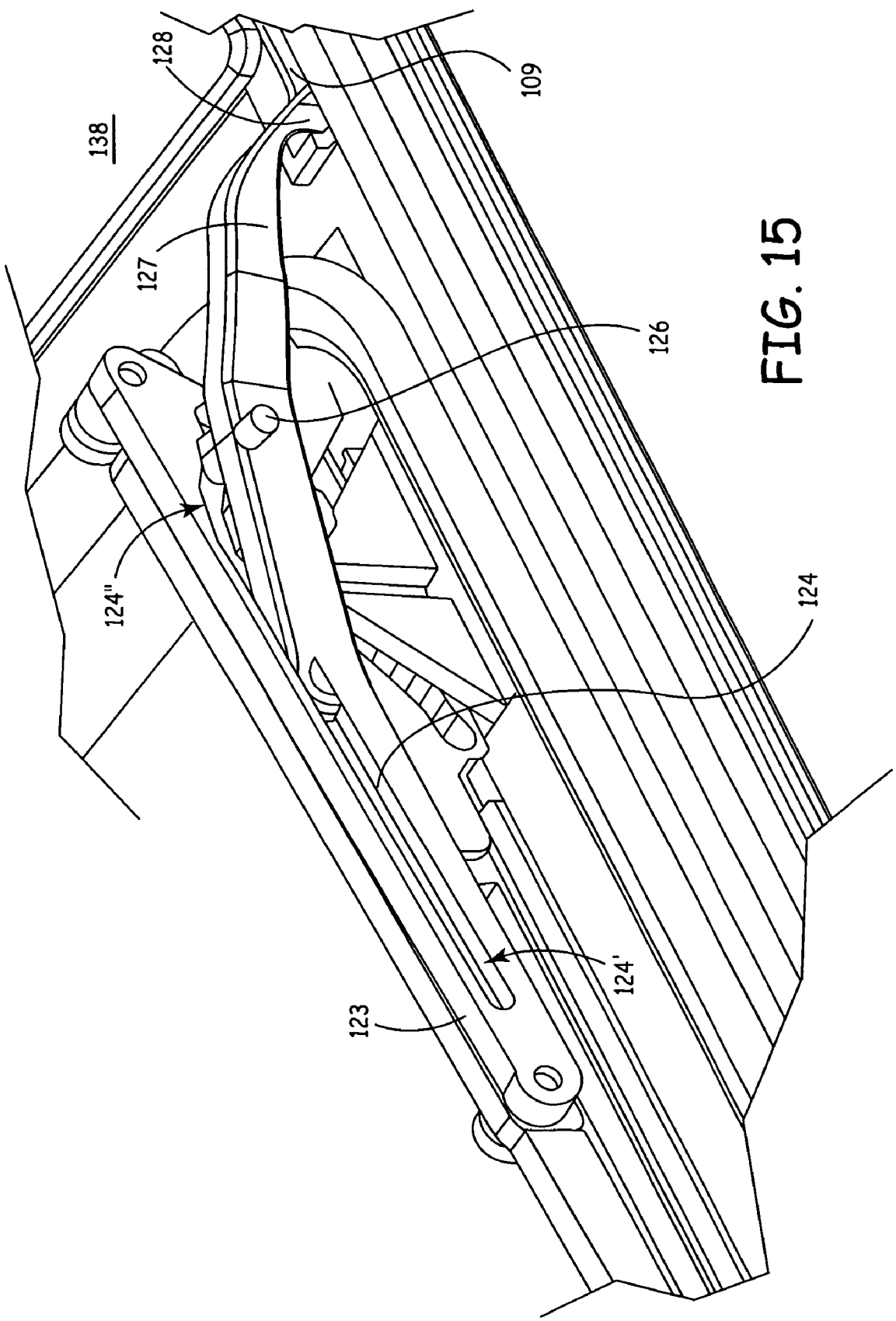

FIGS. 14 and 15 very schematically show a possible embodiment of the arm 127, which is suspended via a spatial pivot at the front end, so that the arm 127 can pivot downwards as well as outwards, whilst the guide slot 124 comprising front guide portion 124' and rear guide portion 124" of the link 123 is designed as desired for effecting lateral movement of the guide pin 126 that engages in the guide slot 124.

FIGS. 16a–16i collectively illustrate height adjusting mechanism 5 engaging and disengaging closure element 4 as closure element 4 moves from a closed position to an open, rearward position and is very similar to the movements illustrated in FIGS. 3–10. A main difference is that the front pin 25 of arm 27 is not in engagement with a front slot portion 24' (illustrated in FIG. 2) but with a separate slot 25".

Figure 16A:
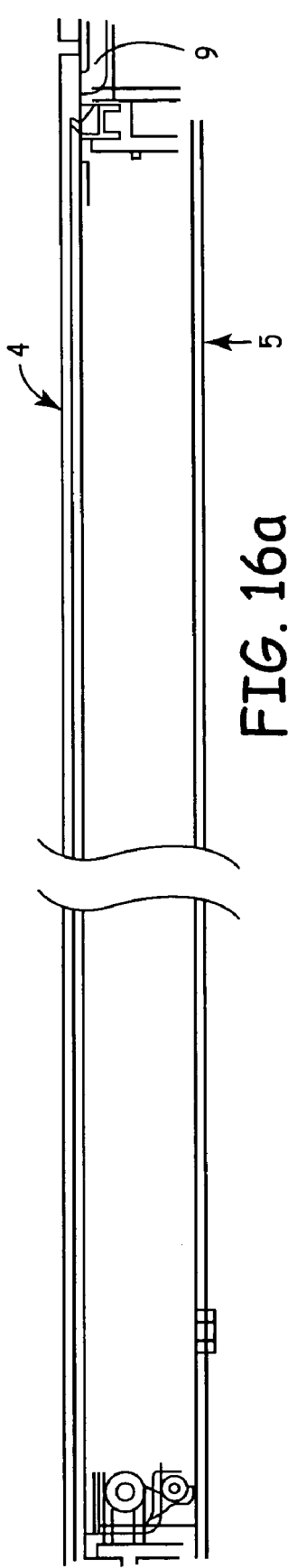
Figure 16B:
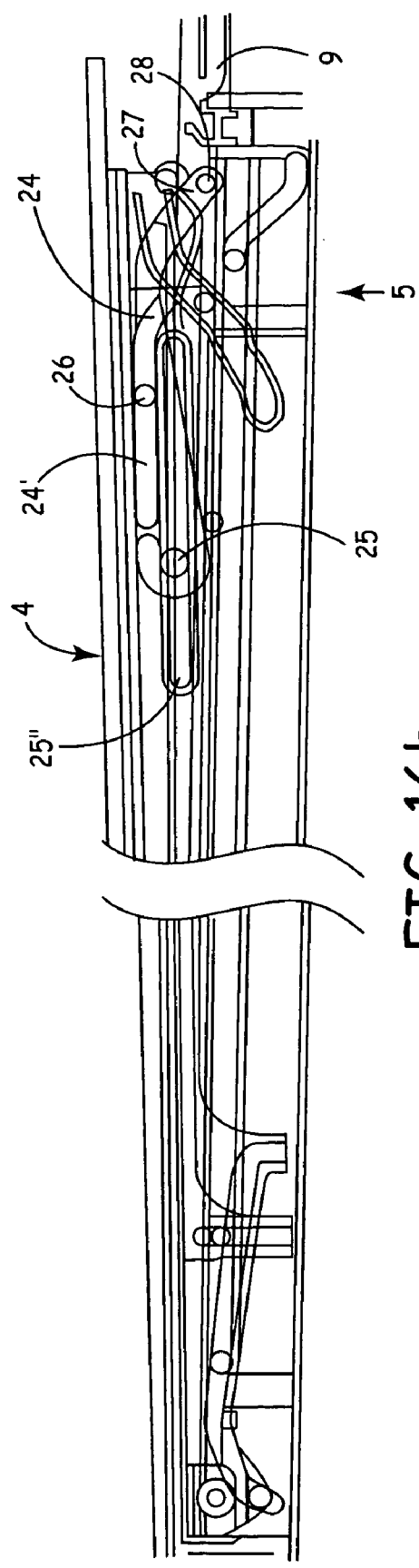

FIG. 16a generally illustrates closure element 4 in a closed position. FIGS. 16b–16d illustrate guide pin 26 moving in front guide slot portion 124' as closure element 4 is opened. FIGS. 16d–16e illustrate downward pivoting of arm 27 causing guide element 28 to engage second longitudinal guide 9. FIGS. 16e–16h illustrate closure element 4 being moved first to a higher position then a lower position as guide pin 26 moves rearward along extension or rear slot portion 24" of guide slot 24. FIG. 16e shows that pin 32 has almost left curved slot 31. Guide element 28 of arm 27 has come into full engagement with guide 9. Thus, the closure element 4 will be supported by arm 27 when the pin 32 leaves the slot 31 completely. Dotted curve B illustrates the approximate path of guide element 28 as it moves backward into engagement with guide 9. The height adjustment mechanism 5 ensures that guide element 28 is raised high enough to enter guide portion 9' of guide 9 upon a consecutive lowering movement, which lowering movement is caused by the movement of pin 26 on arm 27 through downwardly extending slot portion 24" of slot 24.

In FIG. 16f, pin 32 has left slot 31. Pin 26 on arm 27 has been moved within slot portion 24" of slot 24, and as a result, the arm 27 is pivoted downward with respect to closure element. As guide element 28 cannot move further downward and the closure element 4 is supported by the arm 27, the closure element 4 will be pivoted upwardly. Thus, in FIG. 16f, closure element 4 has reached its highest position as indicated by the sharp top in dotted curve A, which represents that path of closure element 4 as it is being moved to an open position. At the same time pin 26 has reached the lowest point of slot 24.

FIGS. 16g–16i illustrates closure element 4 disengaged from height adjusting mechanism 5 after pin 32 has left slot 31 as closure element 4 continues towards its rearward open position. Guide pin 26 is positioned or present in rear slot portion 24" of guide slot 24 as closure element 4 moves rearward. In FIG. 16h, arm 27 has been moved further backward, and pin 26 of arm 27 has moved through slot portion 24" which is directed upward. As a result, arm 27 is pivoted upward again with respect to closure element 4. Hence, closure element 4 is pivoted downward as is illustrated in FIGS. 16h and 16i, when compared to FIG. 16g.

Figure 17D:
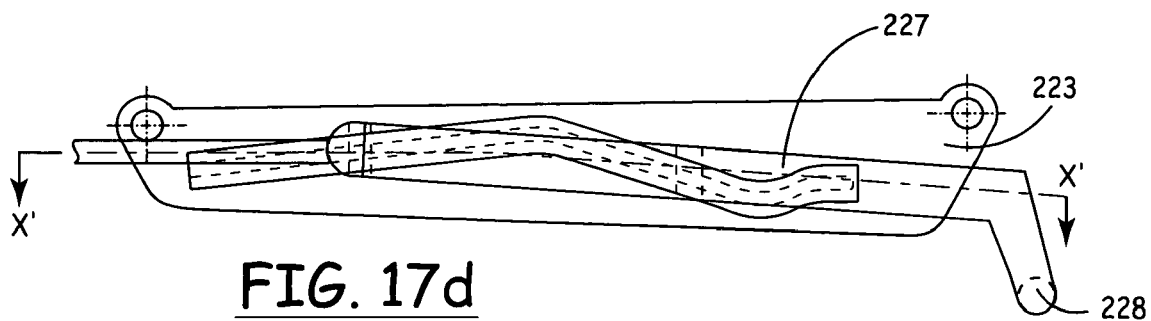
Figure 17E:
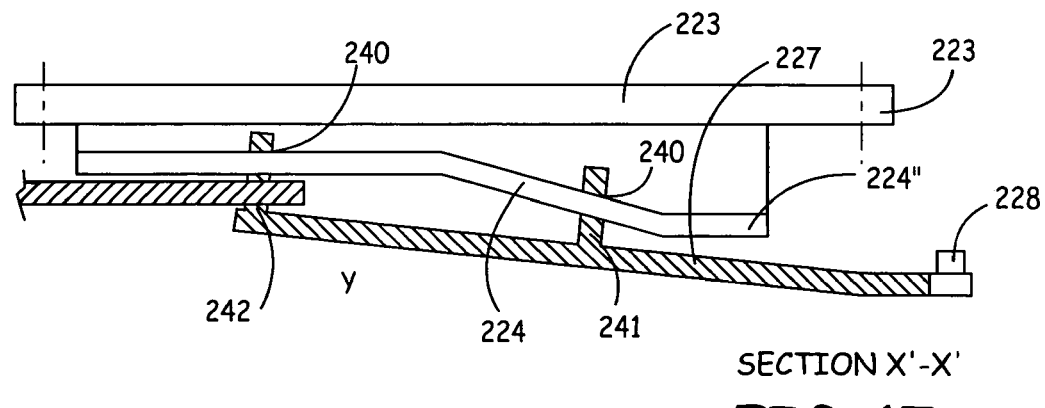
Figure 17F:
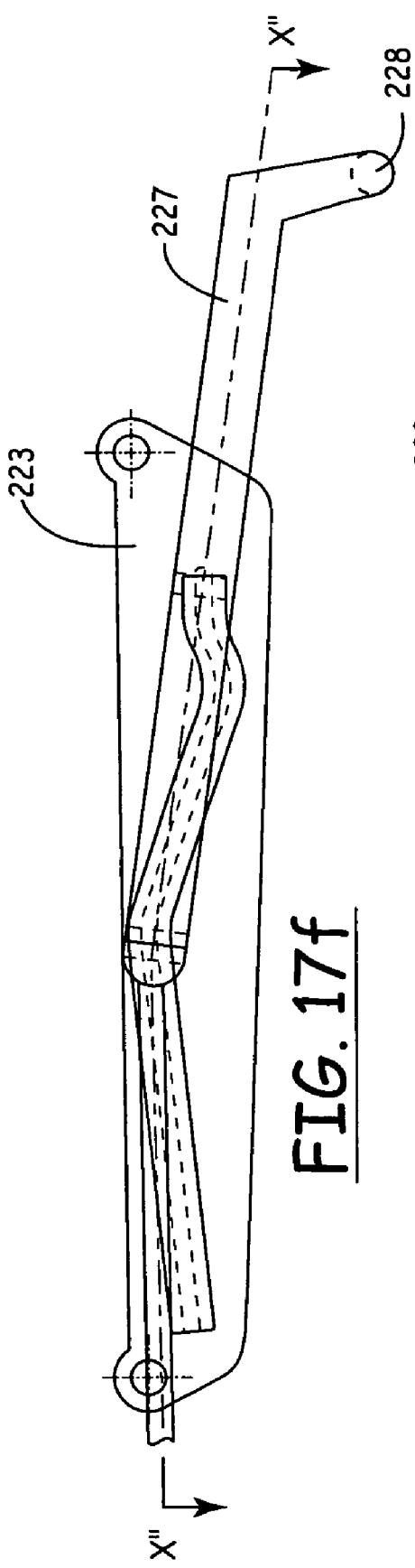
Figure 17G:
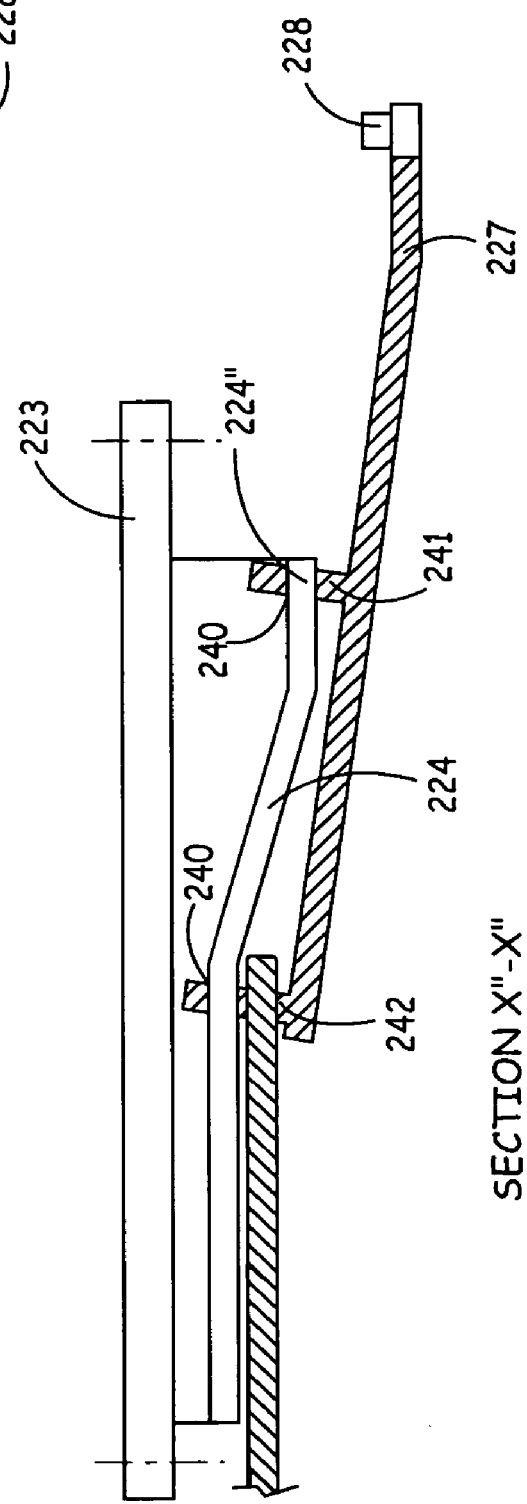

FIGS. 17a–17g illustrates an alternative embodiment of a guide arm that is adapted for lateral movement in order to bring pin or guide element 228 in line with the rearward longitudinal guide 9. FIGS. 17a–17b illustrate position of guide arm 227 when closure element 4 is in the closed position. FIGS. 17d–17e illustrate guide arm 227 that corresponds to a partly open position of the closure element 4. FIGS. 17f–17g illustrate the position of guide arm 227 when closure element 4 is in an entirely open position. FIGS. 17b, 17c, 17e, and 17g illustrate various sectional view as indicated. It is noted that sections x—x, x'—x', and x"—x" pass through both actuating element 220 and guide arm 227.

Importantly, the embodiment of FIGS. 17a–17g does not have a pin-slot connection between arm 27 and link 23 as illustrated at least in FIG. 2. In the embodiment of FIGS. 17a–17g, slot 24 is replaced by a guide rib 224 suitably fixed to link 223 (such as at ends and/or other positions thereof) and around which guide openings 240 in lateral projections 241, 242 of the arm 227 engage. The openings 240 have rounded walls (as illustrated in FIG, 17c) that allow the projections 241, 242, and openings 240 to tilt with respect to the guide rib 224. The same is true for an opening in the actuating section 220 engaging around the rear lateral projection 242 of the arm 227 and allowing vertical and lateral tilting movement of the arm 227 with respect to the actuating section 220. The lateral curve of the guide rib 224 determines the lateral movement of the arm 227 when it is operated. It is noted that the engagement of the projections 241, 242 with the guide rib 224 may be different, as is shown at the enlarged alternative view of section y—y illustrated in FIG. 17c. After pin or guide element 228 has entered guide 9 (not shown but corresponding to FIG. 17f–17g), arm 227 will and cannot make any further lateral movement, so the rear portion of the guide rib 224 is parallel to the guide 9, as illustrated in FIG. 17g.

It is noted that, if desired, the assembly illustrated in FIGS. 17a–17g can be coupled to a height adjusting mechanism in a manner similar to height adjusting mechanism 5 in FIGS. 16a–16i to lift closure element 4. Likewise, a height adjusting mechanism can be provided to lower closure element 4 for rearward positioning below the fixed roof to ensure engagement with the guide 9, 109. In some of these embodiments, lateral movement of arm 227 is not affected by its up and down movement.

The invention is not restricted to the embodiments as described above and shown in the drawings, which can be varied in several ways without departing from the scope of the invention as defined in the appended claims. Thus it is possible to design the rear roof panel 138 as a movable unit, for example as a tilting roof. The second longitudinal guides may be fixed to said movable roof panel, in which case the front panel 104 will move along when it is positioned above the rear panel 138. According to another possibility, a different type of roof member, which may or may not be movable, is disposed behind the roof opening for the panel 104.

The invention claimed is:

1. An open roof construction for a vehicle having an opening (2) in its fixed roof (1), comprising:
a stationary part (3) to be fixed to the roof;
a closure element (4) which is movably supported by said stationary part (3);
a drive unit (7, 8) which can adjust the closure element (4) movable between a closed position, in which it closes the roof opening (2), and an open, rearward position at least partially above a roof portion which is disposed rearwards of the roof opening (2), in which position the roof opening (2) is at least partially opened, wherein said stationary part (3) comprises:
at least a first longitudinal guide (6) extending along the roof opening (2); and
a second longitudinal guide (9) rearwards of the roof opening (2), wherein the closure element (4) is supported near its front side by a front support (12), which is slidably supported in said first longitudinal guide (6), and which is supported rearwards thereof by a height adjusting mechanism (5), which is present in said first longitudinal guide (6) and which supports the closure element (4) at least in two front positions;
a guide element (23) which is slidable in the second longitudinal guide (9) and which supports the closure element (4) at least in rearward positions; and
an adjusting element (27), which is movable in longitudinal directions relative to the closure element (4) by an actuating element (20) that is controlled from the drive unit (7, 8), is disposed under said closure element (4), which adjusting element (27) is fitted with said guide element (28), for engagement into and out of the second longitudinal guide (9).

2. The open roof construction according to claim 1, wherein the adjusting element (27) is an arm (27) which is capable of sliding and pivoting movement under the closure element (4), wherein the guide element 28 is mounted on a free rear end of the arm (27).

3. The open roof construction according to claim 2, wherein the arm (27) includes a pivot (25) near its front end, which pivot (25) is slidable along a guide (24) under the closure element (4).

4. The open roof construction according to claim 3, wherein the forcing guide (24, 26) is provided with a curved guide slot (24, 24', 24") formed under the closure element (4), in which a guide pin (26) which is fixed to the arm (27) engages, which curved guide slot (24) comprises an extension (24") at its rear end, in which the guide pin (26) is present when the guide element (23) is in engagement with the second longitudinal guide (9) and the closure element (4) is out of engagement with the height adjusting mechanism (5).

5. The open roof construction according to claim 1, wherein the actuating element (20) is a section which is capable of sliding movement under the closure element (4).

6. The open roof construction according to claim 5, wherein the actuating element (20) is connected, via a vertically adjustable connection (41), to a driving slide (8) of the drive unit (7, 8) which is slidable in the first longitudinal guide (6).

7. The open roof construction according to claim 6, wherein said vertically adjustable connection (41) includes a vertically extending groove (19) which is formed in the section of the actuating element, as well as an actuating pin (18) which is connected to the drive unit (7, 8).

8. The open roof construction according to claim 1, wherein said height adjusting mechanism (5) includes a pinslot joint (31, 32) between the stationary part (3, 30) and the actuating element (20), and wherein at least one end of the slot (31) is open so as to enable the pin (32) to enter and leave the slot (31).

9. The open roof construction according to claim 8, wherein the slot (31) of said pinslot joint (31, 32) is formed in the stationary part (3, 6) and the pin (32) is formed on the actuating element (20).

10. The open roof construction according to claim 9, wherein the slot (31) of said pin-slot joint (31, 32) is formed in a pivoting arm (30) that is pivotally connected to the stationary part (3, 6).

11. The open roof construction according to claim 10, wherein a control element (35) is present in the guide rail (6, 10) for pivoting the pivoting arm (30) of the height adjusting mechanism (5) which control element (35) can be actuated by the actuating element (20) on the closure element (4).

12. The open roof construction according to claim 11, wherein the pin (32) of the height adjusting mechanism (5) also engages in an at least substantially vertical adjusting slot (36) of the control element (35), which is open at the upper end, so as to actuate the control element (35).

13. The open roof construction according to claim 11, wherein the control element (35) includes a slot (34) which extends in longitudinal and vertical direction, in which a pin (33) which is formed on the pivoting arm (30) of the height adjusting mechanism (5) engages.

14. The open roof construction according to claim 1, wherein the closure element (4) includes a height compensation mechanism (43) on the front side, which comprises a groove (16') formed in the stationary part (3, 17) and a pin mounted to move with the closure element (4), as well as a slot (14) which is connected to the closure element and a pin (13) which is connected to the drive unit (7, 8), wherein the groove (16') and the slot (14) cross one another.

15. The open roof construction according to claim 1, wherein the second longitudinal guide (9) is recessed in the fixed roof.

16. The open roof construction according to claim 1, wherein the second longitudinal guide (9) comprises a horizontally open groove, wherein the guide element (28) is a horizontal pin, which is capable of engaging in said open groove from one side.

17. The open roof construction according to claim 15, wherein the second longitudinal guide (109) is disposed at a side edge of a roof panel (138) which has at least substantially the same cross dimension as the closure element (104) of the open roof construction.

18. A vehicle having a fixed roof (1) and an opening (2) in its fixed roof (1) and fitted with an open root construction comprising:
  a stationary part fixed to the roof;
  a closure element (4) which is movably supported by said stationary part (3);
  a drive unit (7, 8) which can adjust the closure element (4) movable between a closed position, in which it closes the roof opening (2), and an open, rearward position at least partially above a roof portion which is disposed rearwards of the roof opening (2), in which position the roof opening (2) is at least partially opened, wherein said stationary part (3) comprises:
    at least a first longitudinal guide (6) extending along the roof opening (2); and
    a second longitudinal guide (9) rearwards of the roof opening (2), wherein the closure element (4) is supported near its front side by a front support (12), which is slidably supported in said first longitudinal guide (6), and which is supported rearwards thereof by a height adjusting mechanism (5), which is present in said first longitudinal guide (6) and which supports the closure element (4) at least in two front positions;
  a guide element (23) which is slidable in the second longitudinal guide (9) and which supports the closure element (4) at least in rearward positions; and
  an adjusting element (27), which is movable in longitudinal directions relative to the closure element (4) by an actuating element (20) that is controlled from the drive unit (7, 8), is disposed under said closure element (4), which adjusting element (27) is fitted with said guide element (28) for engagement into and out of the second longitudinal guide (9).

19. The open roof construction of claim 3, wherein the arm (27, 127) furthermore includes a forcing guide (24, 124, 26, 126), which forces the arm (27, 127) to pivot upon movement thereof with respect to the closure element (4), and wherein the arm (27, 127) is connected to the actuating element (20) via said pivot (25, 125).

20. The open roof construction of claim 4, wherein the configuration of the guide slot (24) is such that the closure element (4), upon moving out of engagement with the height adjusting mechanism (5), is first moved to a higher position and then to a lower pivoted position.

21. (An open roof construction for a vehicle having an opening (2) in its fixed roof (1), comprising:
  a stationary part (3) to be fixed to the roof;
  a closure element (4) which is movably supported by said stationary part (3);
  a drive unit (7), (8) which can adjust the closure element (4) movable between a closed position, in which it closes the roof opening (2), and an open, rearward position rearwards of the roof opening (2), in which position the roof opening (2) is at least partially opened, wherein said stationary part (3) comprises:
    at least a first longitudinal guide (6) extending along the roof opening (2); and
    a second longitudinal guide (9) rearwards of the roof opening (2), wherein the closure element (4) is supported near its front side by a front support (12), which is slidably supported in said first longitudinal guide (6), and which is supported rearwards thereof by a height adjusting mechanism (5), which is present in said first longitudinal guide (6) and which supports the closure element (4) at least in two front positions;
  a guide element (28, 228) which is slidable in the second longitudinal guide (9) and which supports the closure element (4) at least in rearward positions; and
  an adjusting element (27, 227), which is movable in longitudinal and lateral directions relative to the closure element (4), wherein the adjusting element (27, 227) is fitted with said guide element (28, 228), for engagement into and out of the second longitudinal guide (9).

22. The open roof construction of claim 21, and further comprising:
  a guide rib (224) that is slidably coupled to the adjusting element (27, 227), wherein the guide rib (224) forces adjusting element (27, 227) to move laterally upon rearward movement.

23. The open roof construction of claim 22, wherein the guide rib (224) extends in a transverse direction.

24. The open roof construction of claim 22, wherein the adjusting element (27) is fitted with lateral projections (241, 242) that slidably engage the guide rib (224).

25. The open roof construction of claim 24, wherein the lateral projections (241, 242) comprise openings 240 that are formed so that the adjusting element (227) can tilt relative to the guide rib (224).

26. The open roof construction of claim 21, wherein the closure element (4) is first moved to a higher position and then a lower position when moved from the closed position to the open rearward position, and wherein the open rearward position is above a roof portion.

* * * * *